(12) United States Patent
Butler et al.

(10) Patent No.: US 10,123,156 B2
(45) Date of Patent: Nov. 6, 2018

(54) SYSTEMS AND METHODS FOR FAR-FIELD COMMUNICATION USING A REPURPOSED ANTENNA

(71) Applicant: QUALCOMM Incorporated, San Diego, CA (US)

(72) Inventors: Paul Brandon Butler, San Jose, CA (US); Magnus Olov Wiklund, San Jose, CA (US); Mahbod Mofidi, San Diego, CA (US); Alireza Hormoz Mohammadian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 15/050,283

(22) Filed: Feb. 22, 2016

(65) Prior Publication Data
US 2016/0261976 A1  Sep. 8, 2016

Related U.S. Application Data

(60) Provisional application No. 62/129,439, filed on Mar. 6, 2015, provisional application No. 62/146,022, filed on Apr. 10, 2015, provisional application No. 62/146,844, filed on Apr. 13, 2015, provisional application No. 62/146,817, filed on Apr. 13, 2015.

(51) Int. Cl.
| | |
|---|---|
| *H04W 4/00* | (2018.01) |
| *H04B 5/00* | (2006.01) |
| *G06K 19/07* | (2006.01) |
| *G06K 19/077* | (2006.01) |
| *H01Q 7/00* | (2006.01) |
| *H04W 4/80* | (2018.01) |
| *G06K 7/10* | (2006.01) |

(52) U.S. Cl.
CPC ........ *H04W 4/008* (2013.01); *G06K 7/10316* (2013.01); *G06K 7/10336* (2013.01); *G06K 7/10346* (2013.01); *G06K 19/0724* (2013.01); *G06K 19/07767* (2013.01); *H01Q 7/00* (2013.01); *H04B 5/0012* (2013.01); *H04W 4/80* (2018.02); *G06K 7/10237* (2013.01); *G06K 19/07773* (2013.01)

(58) Field of Classification Search
USPC .............................................. 455/41.1, 41.2
See application file for complete search history.

(56) References Cited

U.S. PATENT DOCUMENTS

| | | | |
|---|---|---|---|
| 7,843,347 B2 | 11/2010 | Nikitin et al. | |
| 8,682,261 B2 | 3/2014 | Ozaki et al. | |
| 8,725,088 B2 | 5/2014 | Ginsburg et al. | |
| 8,831,510 B2 * | 9/2014 | Tanaka ................ | H04W 76/023 455/41.1 |

(Continued)

OTHER PUBLICATIONS

International Search Report and Written Opinion—PCT/US2016/019166—ISA/EPO—dated May 24, 2016.

*Primary Examiner* — Edward Urban
*Assistant Examiner* — Ralph H Justus
(74) *Attorney, Agent, or Firm* — Austin Rapp

(57) ABSTRACT

A method for performing near-field communication (NFC)-type operations in the far-field region using a repurposed antenna is described. The method includes determining whether to perform NFC-type operations in a near-field mode or a far-field mode. The method further includes performing NFC-type operations outside a near-field region using a repurposed antenna when in the far-field mode.

39 Claims, 24 Drawing Sheets

(56) References Cited

U.S. PATENT DOCUMENTS

| | | | |
|---|---|---|---|
| 8,880,100 B2 * | 11/2014 | Dobyns | H04W 4/008 455/41.2 |
| 9,054,750 B2 | 6/2015 | Hillan | |
| 2006/0290472 A1 * | 12/2006 | Onderko | G06K 7/0008 340/10.1 |
| 2007/0164868 A1 * | 7/2007 | Deavours | G06K 19/07749 340/572.7 |
| 2008/0081631 A1 * | 4/2008 | Rofougaran | H01Q 1/38 455/452.1 |
| 2009/0073070 A1 * | 3/2009 | Rofougaran | H04B 5/0012 343/793 |
| 2009/0088077 A1 | 4/2009 | Brown et al. | |
| 2009/0189816 A1 * | 7/2009 | Nikitin | H01Q 1/2208 343/702 |
| 2010/0279234 A1 * | 11/2010 | Yu | G03F 7/0035 430/324 |
| 2010/0279734 A1 * | 11/2010 | Karkinen | H01Q 3/24 455/554.2 |
| 2010/0304770 A1 * | 12/2010 | Wietfeldt | H04W 72/1215 455/509 |
| 2011/0291836 A1 | 12/2011 | Deavours et al. | |
| 2014/0126461 A1 * | 5/2014 | Ghosh | H04W 88/04 370/315 |
| 2014/0266632 A1 * | 9/2014 | Jones | G06K 7/10009 340/10.6 |
| 2014/0334387 A1 * | 11/2014 | Doppler | H04W 74/0816 370/329 |
| 2015/0044963 A1 * | 2/2015 | Konanur | H01Q 7/00 455/41.1 |
| 2015/0249485 A1 * | 9/2015 | Ouyang | H04B 5/0081 455/41.1 |

* cited by examiner

SYSTEMS AND METHODS FOR FAR-FIELD COMMUNICATION USING A REPURPOSED ANTENNA

RELATED APPLICATIONS

This application is related to and claims priority from U.S. Provisional Patent Application Ser. No. 62/129,439, filed Mar. 6, 2015, for "SYSTEMS AND METHODS FOR FAR-FIELD COMMUNICATION USING AN NFC ANTENNA." This application is also related to and claims priority from U.S. Provisional Patent Application Ser. No. 62/146,022, filed Apr. 10, 2015, for "SYSTEMS AND METHODS FOR FAR-FIELD COMMUNICATION USING A SHARED ANTENNA." This application is also related to and claims priority from U.S. Provisional Patent Application Ser. No. 62/146,844, filed Apr. 13, 2015, for "SYSTEMS AND METHODS FOR FAR-FIELD COMMUNICATION USING A SHARED CELLULAR ANTENNA." This application is also related to and claims priority from U.S. Provisional Patent Application Ser. No. 62/146,817, filed Apr. 13, 2015, for "SYSTEMS AND METHODS FOR FAR-FIELD COMMUNICATION USING A SHARED WLAN OR BLUETOOTH ANTENNA."

TECHNICAL FIELD

The described technology generally relates to an apparatus and method of wireless communication. More particularly, the technology relates to near-field communication (NFC)-type operations in the far-field region using a repurposed antenna.

BACKGROUND

The wireless communication environment in a home or an office generally includes a number of independently developed radio access technologies and standards. These technologies were initially designed for target applications and they perform relatively well for these applications. In a typical home or office environment, an access to content (e.g., web, video, etc.) is provided to a broadband modem through the home-owner's IP backhaul connection. For instance, mobile services are provided through the cellular network, through either a macro cell or a femto cell located within the home or office. Wireless local area network (WLAN) access points (APs) provide data connectivity between computers, cell phones, laptops, printers, and other wireless stations using 802.11-based Wi-Fi technology.

Another communication medium currently being implemented in electronic equipment is near-field communication (NFC). The use of NFC interfaces in electronic equipment provides portable devices with functions similar to those of non-contact integrated circuit cards (e.g., radio frequency identification (RFID) cards). In addition, electronic equipment provided with NFC interfaces is typically capable of operating as radio frequency (RF) readers and/or writers to communicate with other NFC devices. A basic aspect of NFC is the use of electromagnetic waves in an RF range and the transmission of information content is realized over a short distance only, for instance in a range of about several centimeters.

A wireless communication device may communicate with a remote device using NFC-type technology. Because NFC typically operates in the electromagnetic near-field region, communications may be limited to short distances. Benefits may be realized by repurposing an antenna to perform NFC-type operations outside the near-field region.

SUMMARY

A method for performing near-field communication (NFC)-type operations in the far-field region using a repurposed antenna is described. The method includes determining whether to perform NFC-type operations in a near-field mode or a far-field mode. The method further includes performing NFC-type operations outside a near-field region using a repurposed antenna when in the far-field mode.

The NFC-type operations may include wireless communication based on NFC protocols or radio frequency identification (RFID) protocols.

Performing NFC-type operations outside the near-field region may include transmitting or receiving a carrier signal operating in a far-field region using the repurposed antenna. The NFC-type operations may be performed in a near-radiating region, a transition region or a radiating region.

In an implementation, determining whether to perform NFC-type operations in the near-field mode or the far-field mode may be based on polling in the near-field region and a far-field region. In another implementation, determining whether to perform NFC-type operations in the near-field mode or the far-field mode may be based on a user selecting to operate a software application that is configured to operate in near-field mode or far-field mode. In yet another implementation, determining whether to perform NFC-type operations in the near-field mode or the far-field mode may be based on location information.

The NFC-type operations may be performed by a far-field radio. The repurposed antenna may be an NFC loop antenna. The NFC-type operations may be performed by an NFC controller.

The method may also include adjusting a matching network from a first impedance used in near-field mode to a second impedance used in far-field mode. The first impedance may produce a first resonant peak that coincides with a near-field frequency and the second impedance may produce a second resonant peak that coincides with a far-field frequency.

The repurposed antenna may be an FM antenna that is shared by an NFC controller and an FM receiver.

The repurposed antenna may be a wireless wide area network (WWAN) antenna. The WWAN antenna may be coupled to an NFC controller and a WWAN block with a diplexer.

The repurposed antenna may be a far-field antenna used for wireless local area network (WLAN) communication or Bluetooth (BT) communication. WLAN operations and NFC-type operations may share a common radio and the far-field antenna. The common radio may be a WLAN 802.11ah radio that is reconfigurable for NFC-type operations in a far-field region. Base band signals from WLAN operations and NFC-type operations may be multiplexed to the common radio. WLAN operations and NFC-type operations may share a low noise amplifier (LNA) and share a power amplifier (PA) for full concurrency. A media access control (MAC), modem and radio used for WLAN may be reconfigured for NFC-type operations.

The method may also include determining whether a far-field frequency for NFC-type operations is supported by the repurposed antenna alone. The repurposed antenna and an NFC loop antenna may be combined to create a composite antenna for performing NFC-type operations outside the near-field region when the far-field frequency is lower than can be supported by the repurposed antenna alone.

The method may also include performing concurrent NFC-type operations inside the near-field region using a NFC loop antenna and outside the near-field region using the repurposed antenna.

Performing NFC-type operations outside a near-field region may include performing a polling frequency sweep using far-field frequencies.

A wireless communication device is also described. The wireless communication device may include a processor, a memory in communication with the processor, and instructions stored in the memory. The instructions are executable by the processor to determine whether to perform NFC-type operations in a near-field mode or a far-field mode. The instructions are also executable to perform NFC-type operations outside a near-field region using a repurposed antenna when in the far-field mode.

An apparatus for wireless communications is also described. The apparatus includes means for determining whether to perform NFC-type operations in a near-field mode or a far-field mode. The apparatus also includes means for performing NFC-type operations outside a near-field region using a repurposed antenna when in the far-field mode.

A computer-program product for wireless communications is also described. The computer-program product includes a non-transitory computer-readable medium having instructions thereon. The instructions include code for causing a wireless communication device to determine whether to perform NFC-type operations in a near-field mode or a far-field mode. The instructions also include code for causing the wireless communication device to perform NFC-type operations outside a near-field region using a repurposed antenna when in the far-field mode.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
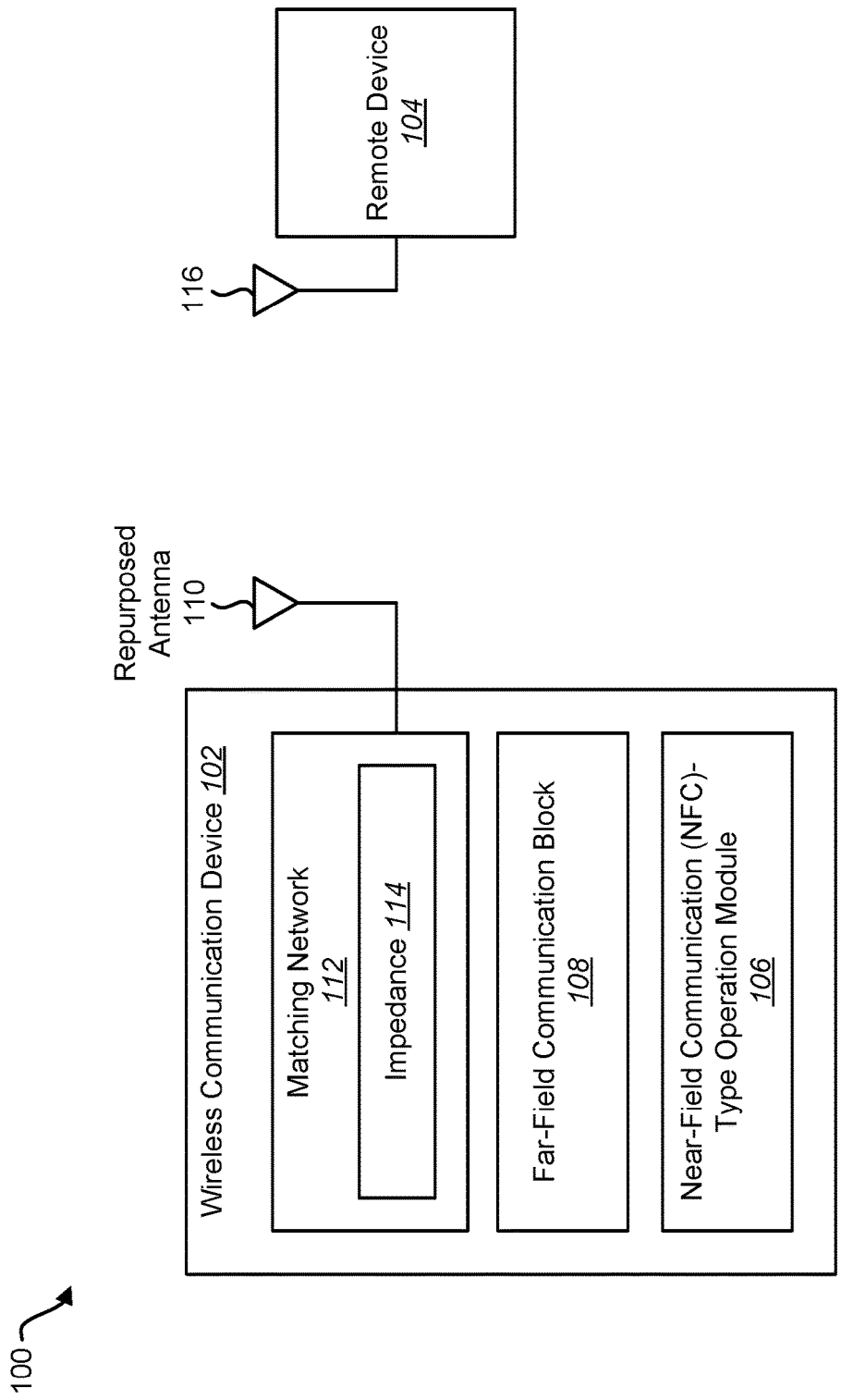
FIG. 1 is a block diagram illustrating one configuration of a wireless communication system for performing near-field communication (NFC)-type operations in the far-field region using a repurposed antenna.

FIG. 1 is a block diagram illustrating one configuration of a wireless communication system 100 for performing near-field communication (NFC)-type operations in the far-field region using a repurposed antenna 110. The wireless communication system 100 may include a wireless communication device 102 that is in communication with a remote device 104.

To enable NFC-type technology, a wireless communication device 102 may operate deep in the non-radiating near-field of the electromagnetic region around an NFC loop antenna. For example, in some scenarios, the wireless communication device 102 may communicate with a remote device 104 by operating in the near-field of the electromagnetic region (referred to herein as the near-field region). These scenarios may include, for example, pairing of devices, tap-to-pay, and ticketing.

These NFC loop antennas are electrically short with respect to the wavelength associated with their operating NFC frequency. The NFC frequency for near-field operation (e.g., near-field frequency) may be 13.56 MHz. The consequence is that NFC loop antennas are predominantly inductively coupled in the reactive region (e.g., the near-field region).

This reactive region coupling fundamentally limits the range that NFC devices can communicate because their field propagation falls with distance from the NFC loop antenna on a higher order than for far-field communication. Without an unfeasible large antenna loop area, distances that NFC devices can communicate are practically limited to a few centimeters.

There are some scenarios where more range from NFC-type technology would be beneficial. In one example, a personal body area network may be implemented with NFC-configured devices. In another example, shopping trolley product scanning may be implemented using NFC technology. In this example, it may be beneficial to scan products equipped with NFC or RFID tags from a distance greater than a few centimeters. Other examples where it may be beneficial to implement NFC-type operations over much longer distances include product status inquiry, warehouse scanning, and NFC enabled mobile handsets.

Small area NFC antennas are still desired in these and other use-case scenarios to allow the use of unwieldy hand-held readers or NFC mobile (e.g., telephone) handsets. Therefore, a challenge is increasing the range of NFC-type operation without necessitating the need to use larger antennas.

A wireless communication device 102 may include an antenna structure that is configured to operate in the far-field region. Antenna structures or coils may be physically (and electrically) long with respect to higher frequency wave lengths. Thus, by selecting higher transmit and receive carrier frequencies that are off-tune from 13.56 MHz for a NFC antenna with associated impedance match, NFC-type operations may be performed in the far-field region. As used herein, the far-field region includes one or more of the near-radiating (e.g., Fresnel) region, transition (from reactive to radiating) region, and the radiating electromagnetic regions. Therefore, as used herein, far-field communication includes wireless communication in the near-radiating region, transition region or radiating region. An antenna structure that is configured to operate in the far-field region may be referred to as a far-field antenna.

As used herein, the term "NFC-type operations" includes wireless communication that is based on NFC protocols or RFID protocols. These communication protocols may be based on the NFC standards or RFID standards. It should be noted that NFC-type operations may be implemented in the far-field region. For example, an NFC-type operation may include far-field RFID operations and/or far-field NFC operations. NFC-type operations using high-frequency carriers may be referred to as high-frequency communication operations.

The wireless communication device 102 may include a far-field communication block 108. The far-field communication block 108 may be configured for wireless communication in the far-field region. The far-field communication block 108 may include a receiver, a transmitter or both a receiver and a transmitter (i.e., a transceiver).

The far-field communication block 108 may perform wireless communication operations using an antenna structure. The antenna structure may include an antenna 110 and a matching network 112 with an impedance 114 configured to operate in the far-field region. Examples of the far-field communication block 108 include an FM receiver, a wireless wide area network (WWAN) (e.g., cellular) transceiver, a wireless local area network (WLAN) (e.g., WiFi) transceiver and/or a Bluetooth transceiver.

The wireless communication device 102 may include an NFC-type operation module 106 to perform NFC-type operations in the far-field region. The NFC-type operation module 106 may be implemented in hardware or software. For example, in one approach, the NFC-type operation module 106 may be an NFC controller that is separate from the far-field communication block 108. In this approach the NFC-type operation module 106 may be included in a chip with the far-field communication block 108. Alternatively, the NFC-type operation module 106 and the far-field communication block 108 may be included on separate chips.

In another approach, the NFC-type operation module 106 may be a software implementation in which NFC-type operations are performed with or without a separate NFC controller. For example, the NFC-type operation module 106 may be a software subsystem in an existing far-field radio. This software-based approach has the advantage of not adding new hardware components to implement NFC-type operations.

The wireless communication device 102 may repurpose the existing far-field antenna structure of the far-field communication block 108 to perform NFC-type operations in the far-field region. As used herein, "repurpose" refers to using of an antenna 110 configured for one type of wireless communication in another type of wireless communication. For example, the wireless communication device 102 may repurpose a far-field antenna 110 configured for use for far-field radio communication (e.g., FM, WWAN, WLAN, Bluetooth) to perform NFC-type operations in the far-field region. In another example, the wireless communication device 102 may repurpose an NFC loop antenna that is configured to operate in the near-field region to perform NFC-type operations in the far-field region.

The NFC-configured wireless communication device 102 may leverage structures and antennas that are physically (and electrically) long with respect to higher frequency wavelengths. Since the wireless communication device 102 operates the repurposed antenna 110 in the far-field region (i.e., near-radiating or radiating far-field region), there is more possibility to extend the communication range. In this approach, the wireless communication device 102 is not limited by reactive region coupling and associated near-field propagation losses.

In a first implementation, the repurposed antenna 110 may be the NFC loop antenna itself. In this implementation, an NFC controller may implement both the far-field communication block 108 and NFC-type operation module 106. This first implementation is described in more detail in connection with FIGS. 5-9.

This first implementation may not change the design of a 13.56 MHz antenna 110 and impedance 114 of the matching network 112, although it does not exclude the ability to make optimization adjustments for far-field operation, nor does it change the normal near-field communication operation of NFC enabled devices. This implementation can be used to enable communication between reader and tags of both 13.56 MHz and higher than 13.56 MHz operating frequencies (i.e., far-field frequencies). For example, a remote device 104 may operate in frequency bands centered at (but not limited to) frequencies of 27.12 MHz, 40.68 MHz, 433.92 MHz, 915 MHz & 2.45 GHz. It should be noted that in one configuration, these far-field frequencies may be harmonics of the near-field frequency (e.g., 13.56 MHz NFC frequency). In another configuration, these far-field frequencies 526 need not be harmonics of the near-field frequency.

In this first implementation, the matching network 112 may be shared for both near-field and far-field operation. However, this approach may compromise both modes of operation because the matching network 112 needs to resonant at two frequencies for the corresponding near-field and far-field operation. Therefore, benefits may be achieved by decoupling the matching network 112 from near-field and far-field operation.

In a second implementation, the repurposed antenna 110 is an FM antenna. Many mobile handsets have an FM radio antenna structure physically (and electrically) long with respect to higher frequency wave lengths. This FM antenna is usually implemented as part of the headphone cable that attaches to the wireless communication device 102. By selecting a higher transmit and receive NFC carrier frequencies that are off-tune from 13.56 MHz for an attached FM antenna with associated impedance match, NFC-type operations may be performed in the far-field region. This second implementation is described in more detail in connection with FIGS. 10-14.

In a third implementation, the repurposed antenna 110 is a WWAN antenna. In this implementation, a cellular antenna may be used for NFC-type operations in the far-field region. This implementation repurposes the WWAN antenna for NFC-type operations and adds a far-field mode of operation for NFC-type communication. This third implementation is described in more detail in connection with FIGS. 15-16.

In a fourth implementation, the repurposed antenna 110 is a WLAN or Bluetooth antenna. In this implementation, the far-field antenna configured for WLAN or Bluetooth communication may be repurposed for NFC-type operations. This implementation repurposes the WLAN or Bluetooth antenna and adds a far-field mode of operation for NFC-type communication. This fourth implementation is described in more detail in connection with FIGS. 17-21.

Figure 2:
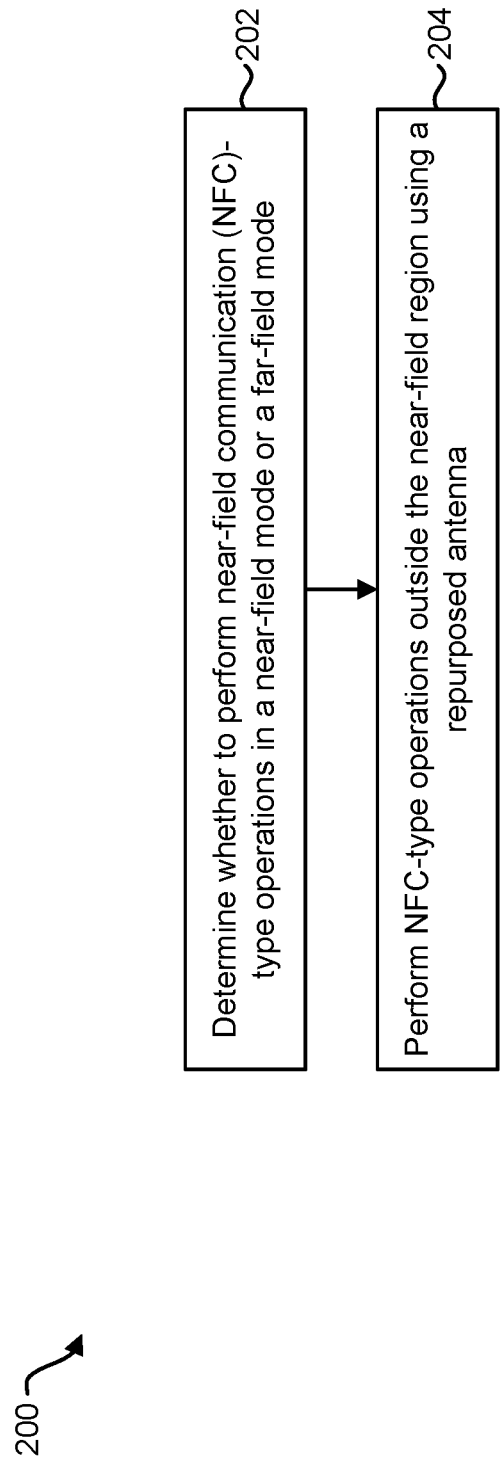
FIG. 2 is a flow diagram illustrating a method for performing NFC-type operations in the far-field region using a repurposed.

FIG. 2 is a flow diagram illustrating a method 200 for performing NFC-type operations in the far-field region using a repurposed antenna 110. The method 200 may be performed by a wireless communication device 102. The wireless communication device 102 may be configured with a far-field communication block 108 and an antenna 110 that may be repurposed for NFC-type operations in the far-field region. The repurposed antenna 110 may be an NFC loop antenna, or another antenna configured for far-field operation (e.g., an FM antenna, a WWAN antenna, a WLAN antenna or a Bluetooth antenna).

The wireless communication device 102 may determine 202 whether to perform near-field communication (NFC)-type operations in a near-field mode or a far-field mode. The NFC-type operations may include wireless communication based on NFC protocols or RFID protocols.

When in near-field mode, the wireless communication device 102 may perform NFC-type operations inside a near-field region using the NFC loop antenna. For example, while in near-field mode, the wireless communication device 102 may communicate with a remote device 104 using a carrier signal that has a near-field frequency. In the case of NFC, the near-field frequency of the carrier signal may be 13.56 MHz. The communication may operate in the electromagnetic near-field region. During the wireless communication, the wireless communication device 102 may be inductively coupled to the remote device 104.

When in far-field mode, the wireless communication device 102 may use a far-field frequency for NFC-type operations. The far-field frequency may be a frequency greater than a near-field frequency (e.g., 13.56 MHz).

The wireless communication device 102 may determine 202 whether to perform near-field communication (NFC)-type operations in a near-field mode or a far-field mode based on various factors. In an implementation, the wireless communication device 102 may perform polling. With polling, the wireless communication device 502 may communicate with a remote device 104 to determine which signaling technologies can be used (e.g., NFC-A, NFC-B, NFC-F, etc.).

The wireless communication device 102 may determine 202 to perform polling in the near-field region, the far-field region or both. When in near-field mode, the wireless communication device 102 may poll a remote device 104 in the near-field region using a near-field frequency. When in far-field mode, the wireless communication device 102 may poll a remote device 104 in the far-field region using a far-field frequency.

In an implementation, the wireless communication device 102 may determine 202 to perform polling in a near-field mode or a far-field mode individually. For example, if the wireless communication device 102 has a single radio to perform NFC-type operations in both the near-field region and in the far-field region, then the wireless communication device 102 may schedule times to operate in the near-field region and the far-field region. These times may be scheduled in an interleaved fashion to allow the single radio to switch between near-field mode and far-field mode.

In another implementation, the wireless communication device 102 may determine 202 to perform polling in a near-field mode or a far-field mode concurrently. For example, if the wireless communication device 102 has a radio to perform NFC-type operations in the near-field region and a separate radio to perform NFC-type operations in the far-field region, then the wireless communication device 102 may simultaneously perform NFC-type operations in the near-field region and in the far-field region. The far-field operations may appear as noise to the near-field radio and vice-versa. For example, the wireless communication device 102 may perform a low power NFC tag detection in the near-field region while simultaneously performing NFC-type operations in the far-field region.

In another implementation, the wireless communication device 102 may determine 202 whether to perform NFC-type operations in a near-field mode or a far-field mode based on a given application running on the wireless communication device 102. For example, a program (e.g., app) on the wireless communication device 102 may be configured to operate in near-field mode or far-field mode. A user or automated process may select a given mode of operation. For example, a user may select a mobile payment application that operates in the far-field mode. Upon receiving an indication of this selection, the wireless communication device 102 may determine 202 to perform NFC-type operations in the far-field mode.

In yet another implementation, the wireless communication device 102 may determine 202 whether to perform NFC-type operations in a near-field mode or a far-field mode based on location information. The wireless communication device 102 may obtain location information and select near-field mode or far-field mode based on that location information. For example, based on the location information, the wireless communication device 102 may determine that it is entering a grocery store where it can perform product scanning using NFC-type operations in the far-field region.

In an implementation, the location information may be GPS coordinates of the wireless communication device 102. The wireless communication device 102 may query a database to determine whether to select near-field mode or far-field mode based on the current GPS coordinates.

In another implementation, the location information may be obtained from beacons or tags that provide a unique identification (ID). The wireless communication device 102 may scan a beacon or tag to determine the unique ID. The wireless communication device 102 may then query a database to determine the location of beacon or tag. Based on this location information, the wireless communication device 102 may select near-field mode or far-field mode. This implementation may be beneficial in indoor operation where a GPS or other broadcast signals may not be available.

In yet another implementation, the wireless communication device 102 may determine 202 whether to perform NFC-type operations in a near-field mode or a far-field mode based on the type of radio that is available to perform NFC-type operations. For example, if the wireless communication device 102 only has a far-field radio available, the wireless communication device 102 may determine 202 to perform NFC-type operations in a far-field mode.

The wireless communication device 102 may perform 204 NFC-type operations outside the near-field region using the repurposed antenna 110. The wireless communication device 102 may communicate with one or more remote devices 104 in a far-field region (e.g., near-radiating region, a transition region or a radiating region). For example, the wireless communication device 102 may transmit or receive a carrier signal operating outside of the near-field region using the repurposed antenna 110 and a matching network 112 (e.g., far-field matching network) tuned to the far-field frequency.

In an implementation, an NFC controller may perform 204 the NFC-type operations in the far-field region using the repurposed antenna 110. In another implementation, the NFC-type operations may be performed 204 by a far-field radio (e.g., WWAN, WLAN or Bluetooth radio). In this implementation, the NFC-type operations may be performed by a subsystem of the far-field radio.

Figure 3:
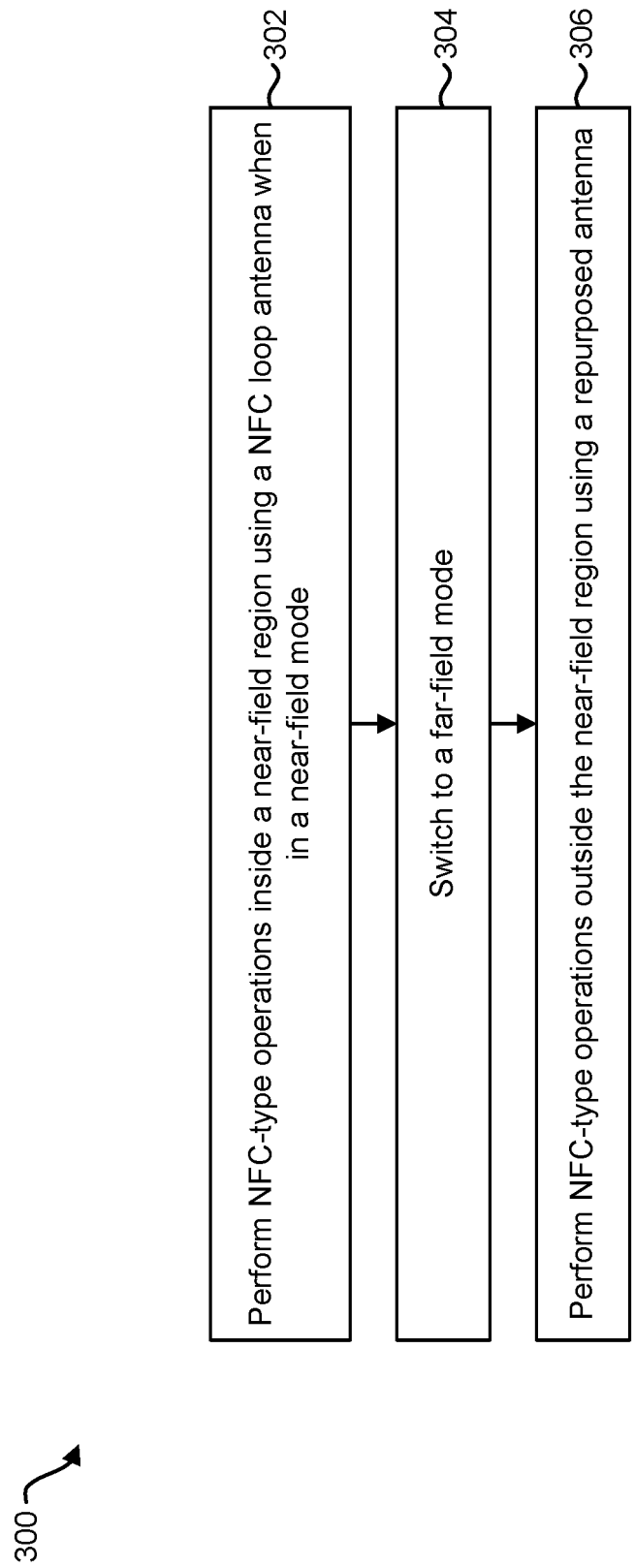
FIG. 3 is a flow diagram illustrating another method for performing NFC-type operations in the far-field region using a repurposed antenna.

FIG. 3 is a flow diagram illustrating another method 300 for performing NFC-type operations in the far-field region using a repurposed antenna 110. The method 300 may be performed by a wireless communication device 102. The wireless communication device 102 may be configured with a far-field communication block 108, NFC circuitry and an antenna 110 that may be repurposed for NFC-type operations in the far-field region.

The NFC circuitry may include an NFC controller, NFC loop antenna and a matching network 112. The repurposed antenna 110 may be an NFC loop antenna, an FM antenna, a WWAN antenna, a WLAN antenna or a Bluetooth antenna. The repurposed antenna 110 may be repurposed for use by the NFC controller. Alternatively, the repurposed antenna 110 may be a hybrid antenna created from existing structures of the wireless communication device 102 (e.g., printed circuit board (PCB) traces, ground layers and metal structures).

The wireless communication device 102 may perform 302 NFC-type operations inside a near-field region using the NFC loop antenna when in a near-field mode. For example, while in near-field mode, the wireless communication device 102 may communicate with a remote device 104 using a carrier signal that has a near-field frequency. In the case of NFC, the near-field frequency of the carrier signal may be 13.56 MHz. The communication may operate in the electromagnetic near-field region. During the wireless communication, the wireless communication device 102 may be inductively coupled to the remote device 104.

The wireless communication device 102 may switch 304 to a far-field mode. When in far-field mode, the wireless communication device 102 may switch to a far-field frequency. The far-field frequency may be a frequency greater than the near-field frequency (e.g., 13.56 MHz). In one configuration, the far-field frequency may be a harmonic of the near-field frequency. The wireless communication device 102 may generate a carrier signal using the far-field frequency.

The wireless communication device 102 may perform 306 NFC-type operations outside the near-field region using the repurposed antenna 110. The wireless communication device 102 may communicate with one or more remote devices 104 in a far-field region (e.g., near-radiating region, a transition region or a radiating region). For example, the wireless communication device 102 may transmit or receive a carrier signal operating outside of the near-field region using the repurposed far-field antenna 110 and a matching network 112 (e.g., far-field matching network) tuned to the far-field frequency. The one or more remote devices 104 may be tuned to operate outside of the near-field.

The wireless communication device 102 may determine whether the far-field frequency is supported by the repurposed antenna 110 alone. If the far-field frequency is lower than can be supported by the repurposed antenna 110 alone, the wireless communication device 102 may combine the repurposed antenna 110 with the NFC loop antenna to create a composite antenna for NFC-type operations in the far-field region.

Figure 4:
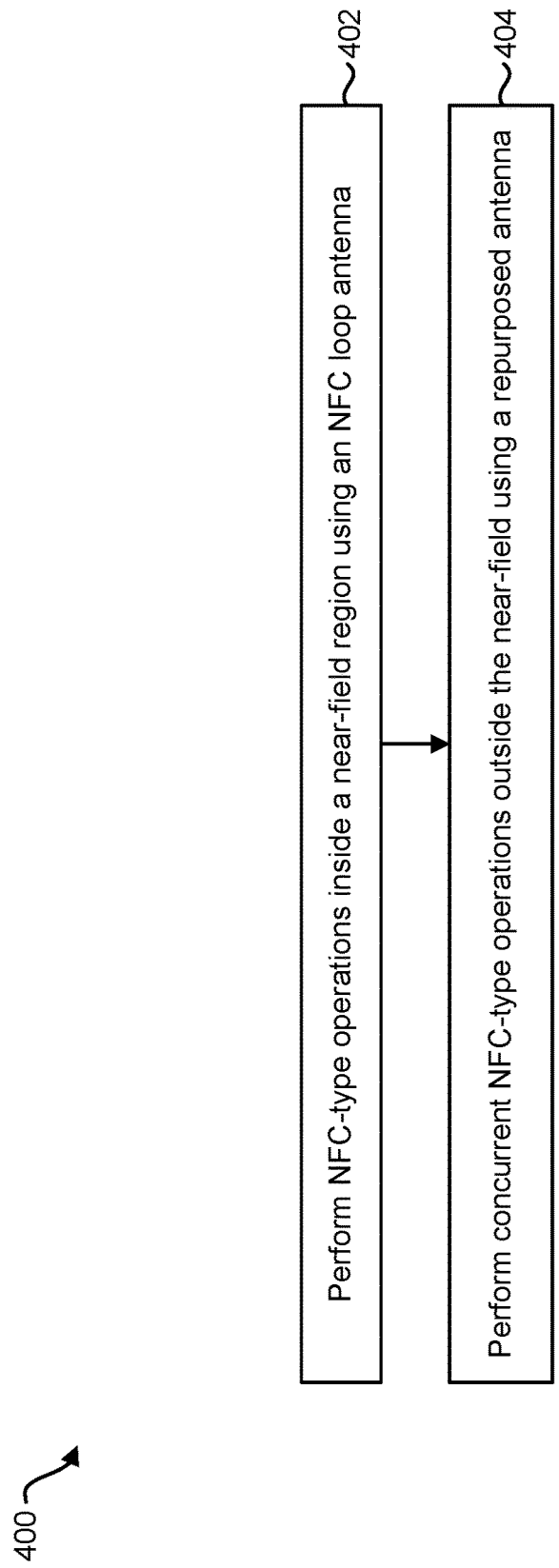
FIG. 4 is a flow diagram illustrating a method for concurrent near-field and far-field communication using an NFC loop antenna and a repurposed antenna.

FIG. 4 is a flow diagram illustrating a method 400 for concurrent near-field and far-field communication using an NFC loop antenna and a repurposed antenna 110. The method 400 may be performed by a wireless communication device 102. The wireless communication device 102 may be configured with a far-field communication block 108, NFC circuitry and an antenna 110 that may be repurposed for NFC-type operations in the far-field region.

The NFC circuitry may include an NFC controller, NFC loop antenna and a matching network 112. The repurposed antenna 110 may be an NFC loop antenna, an FM antenna, a WWAN antenna, a WLAN antenna or a Bluetooth antenna. The repurposed antenna 110 may be repurposed for use by the NFC controller. Alternatively, the repurposed antenna 110 may be a hybrid antenna created from existing structures of the wireless communication device 102 (e.g., (PCB) traces, ground layers and metal structures).

The wireless communication device 102 may perform 402 NFC-type operations inside a near-field region using the NFC loop antenna. For example, the wireless communication device 102 may communicate with a remote device 104 using a carrier signal that has a near-field frequency. In the case of NFC, the near-field frequency of the carrier signal may be 13.56 MHz. The communication may operate in the electromagnetic near-field region. During the wireless communication, the wireless communication device 102 may be inductively coupled to the remote device 104.

The wireless communication device 102 may also perform 404 concurrent NFC-type operations outside the near-field using the repurposed antenna 110. For example, in concurrent wireless communication, the wireless communication device 102 may perform NFC-type operations using the near-field frequency and NFC-type operations outside of the near-field region using one or more far-field frequencies.

A near-field carrier and a far-field carrier may be used for both read and write operations. For example, the wireless communication device 102 may communicate with a first remote device 104 using a carrier signal with a far-field frequency using the repurposed antenna 110. The wireless communication device 102 may concurrently communicate with a second remote device 104 using a carrier signal with a near-field frequency using the NFC loop antenna.

Figure 5:
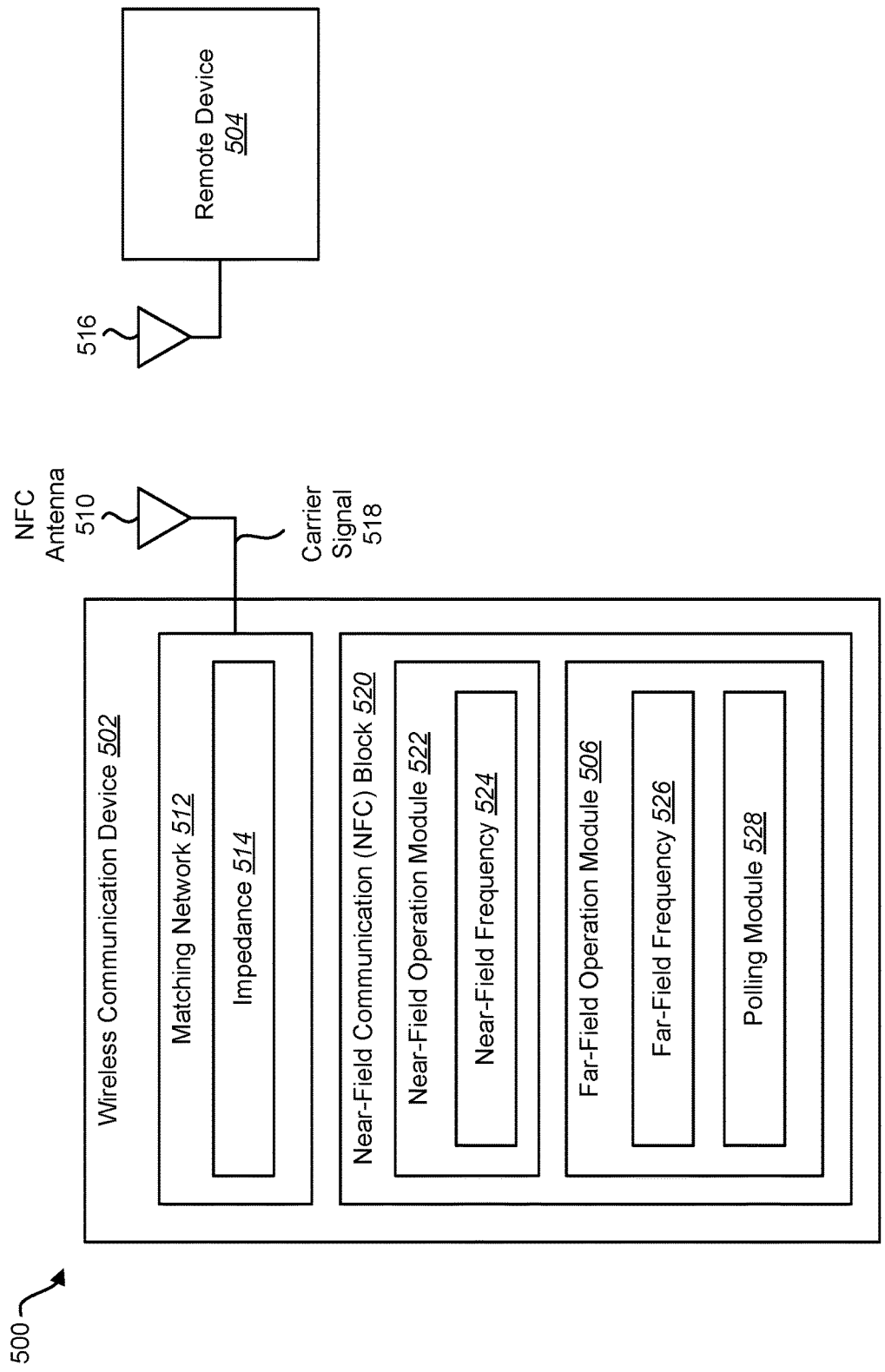
FIG. 5 is a block diagram illustrating one configuration of a wireless communication system for performing NFC-type operations in the far-field region using a repurposed NFC antenna.

FIG. 5 is a block diagram illustrating one configuration of a wireless communication system 500 for performing NFC-type operations in the far-field region using a repurposed NFC antenna 510. The wireless communication system 500 may include a wireless communication device 502 that is in communication with a remote device 504. In one configuration, the wireless communication device 502 and the remote device 504 may communicate using inductively coupled communication.

In one implementation of inductively coupled communication, the wireless communication device 502 and the remote device 504 may use near-field communication (NFC). In the context of near-field communications, there are two devices communicating: an initiator and a target. The wireless communication device 502 may be an initiator NFC device and the remote device 504 may be a target NFC device. The antenna 510 of an initiator NFC device produces a radiated field (also referred to as a magnetic field or an electromagnetic field) that is received by the antenna 516 of the target NFC device. The remote device 504 (e.g., the target NFC device) has a transmitter and a receiver. The wireless communication device 502 (e.g., the initiator NFC device) also has a transmitter and a receiver. The initiator NFC device may also be referred to as a poller, polling device, reader or initiator. The target NFC device may also be referred to as a listener, listening device, tag or target.

The remote device 504 and the wireless communication device 502 may use one or more NFC signaling technologies to communicate with each other. The NFC signaling technologies may include NFC type-A, NFC type-B and NFC type-F. The NFC signaling technologies differ in the modulation schemes employed.

NFC has four different tag types, which support a subset of the NFC signaling technologies. Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In a configuration, the wireless communication device 502 and the remote device 504 may be operable to communicate using NFC through various interfaces, such as a frame RF interface, ISO-data exchange protocol (DEP) RF interface and NFC-DEP RF interface. In another configuration, the wireless communication device 502 and the remote device 504 may establish an NFC-DEP RF protocol-based communication link with link layer connections defined through a logical link control protocol (LLCP). In still another configuration, the wireless communication device 502 and the remote device 504 may be operable to be connected to an access network and/or core network (e.g., a CDMA network, a GPRS network, a UMTS network, and other types of wireline and wireless communication networks).

The wireless communication device 502 may poll for nearby NFC devices. The remote device 504 may begin to listen when it comes within a few centimeters of the wireless communication device 502. The wireless communication device 502 will then communicate with the remote device 504 to determine which signaling technologies can be used. In one case, the wireless communication device 502 may be acting as a reader. In an example, a user may place a wireless communication device 502 in the vicinity of the remote device 504 to initiate a payment transaction.

The wireless communication device 502 may generate an RF field to communicate with the remote device 504. The wireless communication device 502 may modulate the RF field to send a signal (e.g., data) to the remote device 504. Once the remote device 504 receives that signal, the wireless communication device 502 may transmit a continuous wave to maintain the RF field. The continuous wave may have a carrier frequency. In the case of NFC, the carrier frequency may be 13.56 megahertz (MHz).

In NFC operation, the remote device 504 may receive the RF field. The remote device 504 may respond by performing modulation on top of the continuous wave. The wireless communication device 502 may receive the modulated signal and may try to decode it.

The wireless communication device 502 may repurpose the NFC antenna 510 to perform NFC-type operations outside the near-field region. In this implementation, the repurposed antenna 110 is the NFC antenna 510. An NFC-configured wireless communication device 502 may leverage the fact that NFC antenna structures (or coils) are physically (and electrically) long with respect to higher frequency wave lengths. Thus, the wireless communication device 502 may select higher transmit and receive carrier frequencies to perform wireless communication outside of the near-field region while still using the near-field communication (NFC) antenna circuitry.

During wireless communication with the remote device 504, the wireless communication device 502 may transmit or receive a signal operating outside of the near-field region using NFC antenna circuitry. The signal may be a carrier signal 518 that has a carrier frequency greater than 13.56 megahertz (MHz). The remote device 504 may be a tag (e.g., RFID tag or NFC tag) or an NFC-equipped handset device that is also configured to operate outside the near-field region.

For far-field frequencies 526, the wireless communication device 502 may transmit and receive off-tune from 13.56 MHz for an NFC antenna with an associated impedance 514 match. Communication operation may be achieved in the far-field region.

Because the wireless communication device 502 may use the NFC antenna 510 in the near-radiating or radiating far-field, the wireless communication device 502 may extend the communication range. The wireless communication device 502 is, therefore, not limited by reactive region coupling and associated near-field propagation losses. In other words, the wireless communication device 502 may implement radio frequency (RF) communication using the NFC antenna circuitry.

The wireless communication device 502 may repurpose the NFC antenna 510 for far-field operation. The wireless communication device 502 may also add a mode of operation for far-field communication in which the wireless communication device 502 generates a carrier frequency at a far-field frequency 526 that is greater than the near-field frequency 524 (e.g., 13.56 MHz). Thus, the wireless communication device 502 may add far-field (e.g., transition or near-radiating region) communication capability to NFC.

The described systems and methods can be used to enable communication between reader (e.g., NFC-equipped handsets) and tags of both 13.56 MHz and higher than 13.56 MHz operating frequencies.

In one implementation, the wireless communication device 502 may implement far-field wireless communications using NFC protocols. For example, the wireless communication device 502 may perform carrier modulation of the carrier signal 518 with the remote device 504 according to NFC protocols. The remote device 504 may perform active load modulation (ALM) or passive load modulation (PLM) of the received carrier signal 518. However, a carrier frequency higher than 13.56 MHz may be used for the carrier signal 518. In the case of ALM, the wireless communication device 502 and the remote device 504 may take turns generating the carrier signal 518 at a far-field frequency 526.

In one example of carrier modulation, the wireless communication device 502 may modulate its own outgoing carrier signal 518 to send a message. The remote device 504 may passively or actively load modulate this incoming carrier signal 518, and thus respond with a load modulation signal. The remote device 504 may also take a turn at transmitting its own carrier signal 518, which it modulates to send a message back to the wireless communication device 502.

Furthermore, the wireless communication device 502 may power a remote tag as in NFC, but this may be accomplished in an electromagnetic region outside the near-field. Additionally, polling of the remote device 504 may be accomplished according to NFC protocols, but the polling may take place at one or more carrier frequencies higher than 13.56 MHz.

In one implementation, the wireless communication device 502 may include an NFC block 520 and NFC antenna circuitry. The NFC antenna circuitry may include a matching network 512 and the NFC antenna 510. The NFC antenna 510 may be a loop or coil antenna. The matching network 512 may have a certain impedance 514 that is configured to produce resonance in the NFC antenna 510 circuitry at the NFC frequency (e.g., 13.56 MHz).

In one configuration, the NFC block 520 may be an NFC controller. The NFC block 520 may include a near-field operation module 522 and a far-field operation module 506. The near-field operation module 522 may implement normal NFC-type operations. When in normal near-field mode, the wireless communication device 502 may generate a carrier frequency at the near-field frequency 524 (e.g., 13.56 MHz) to communicate with the remote device 504 in the near-field region.

The far-field operation module 506 may implement wireless communication outside of the near-field region using the NFC antenna circuitry. When in far-field mode, the wireless communication device 502 may generate a carrier frequency at a far-field frequency 526 that is greater than 13.56 MHz to communicate with the remote device 504. The remote device 504 may be similarly tuned to operate outside of the near-field region. For example, the remote device 504 may be configured to use NFC antenna circuitry to receive and transmit a far-field carrier signal 518.

In one implementation, the wireless communication device 502 may maintain the design of a 13.56 MHz NFC antenna 510 and impedance 514 matching for wireless communication outside of a near-field region. In other words, the wireless communication device 502 may reuse the NFC antenna 510 and matching network 512 impedance 514 for both near-field operation and far-field operation. Therefore, in this implementation, the wireless communication device 502 may not change the normal near-field communication operation of NFC enabled devices.

In another implementation, the wireless communication device 502 may adjust the matching network 512 from a first impedance 514 used during near-field operation to a second impedance 514 used during far-field operation. In this implementation, the matching network 512 impedance 514 may be optimized for the far-field frequency 526. The first impedance 514 may produce a first resonant peak that coincides with the near-field frequency 524. The second impedance 514 may produce a second resonant peak that coincides with the far-field frequency 526.

It should be noted that both a near-field (e.g., 13.56 MHz) carrier and a far-field carrier can be used for both read and write operations. In one implementation, the wireless communication device 502 may perform concurrent wireless communication outside of the near-field region using the NFC antenna circuitry. In concurrent wireless communication, the wireless communication device 502 may perform both normal NFC communications (using the near-field frequency 524) and wireless communication outside of a near-field region (using one or more far-field frequencies 526).

A near-field carrier and a far-field carrier may be used for both read and write operations. For example, the wireless communication device 502 may communicate with a first remote device 504 using a carrier signal 518 with a far-field frequency 526. The wireless communication device 502 may concurrently communicate with a second remote device 504 using a carrier signal 518 with a near-field frequency 524.

In another implementation, the wireless communication device 502 may perform read and write operations with a first remote device 504 using a far-field frequency 526 at a separate time than read and write operations with a second remote device 504 using a near-field frequency 524. In this implementation, the wireless communication device 502 may transmit or receive far-field carrier signals 518 at separate times for the near-field frequency 524 and each far-field frequency 526.

The wireless communication device 502 may operate in multiple modes for different frequencies. In one configuration, the far-field operation module 506 may be configured to perform wireless communication using multiple far-field frequencies 526. For example, the far-field operation module 506 may perform wireless communication with one or more remote devices 504 using 27.12 MHz, 40.68 MHz, 433.92 MHz, 915 MHz or 2.45 GHz carrier frequencies.

In yet another implementation, the wireless communication device 502 may perform polling using one or more far-field frequencies 526. For example, a polling module 528 may perform a polling frequency sweep using frequencies outside the near-field. This may be done to poll one or more remote devices 504 operating at the far-field frequencies 526.

The described systems and methods will result in NFC-based communications outside the near-field region. Therefore, the range of NFC may be extended. The described systems and methods may maintain the existing NFC circuitry (e.g., matching network 512 and NFC antenna 510) to simplify design and implementation. However, further optimization adjustments (e.g., matching network 512 impedance 514 adjustment) may be made to achieve improved performance. Additionally, because the communication between the wireless communication device 502 and the remote device 504 occurs outside the near-field, the communication is less susceptible to interference due to magnetic coupling.

Figure 6:
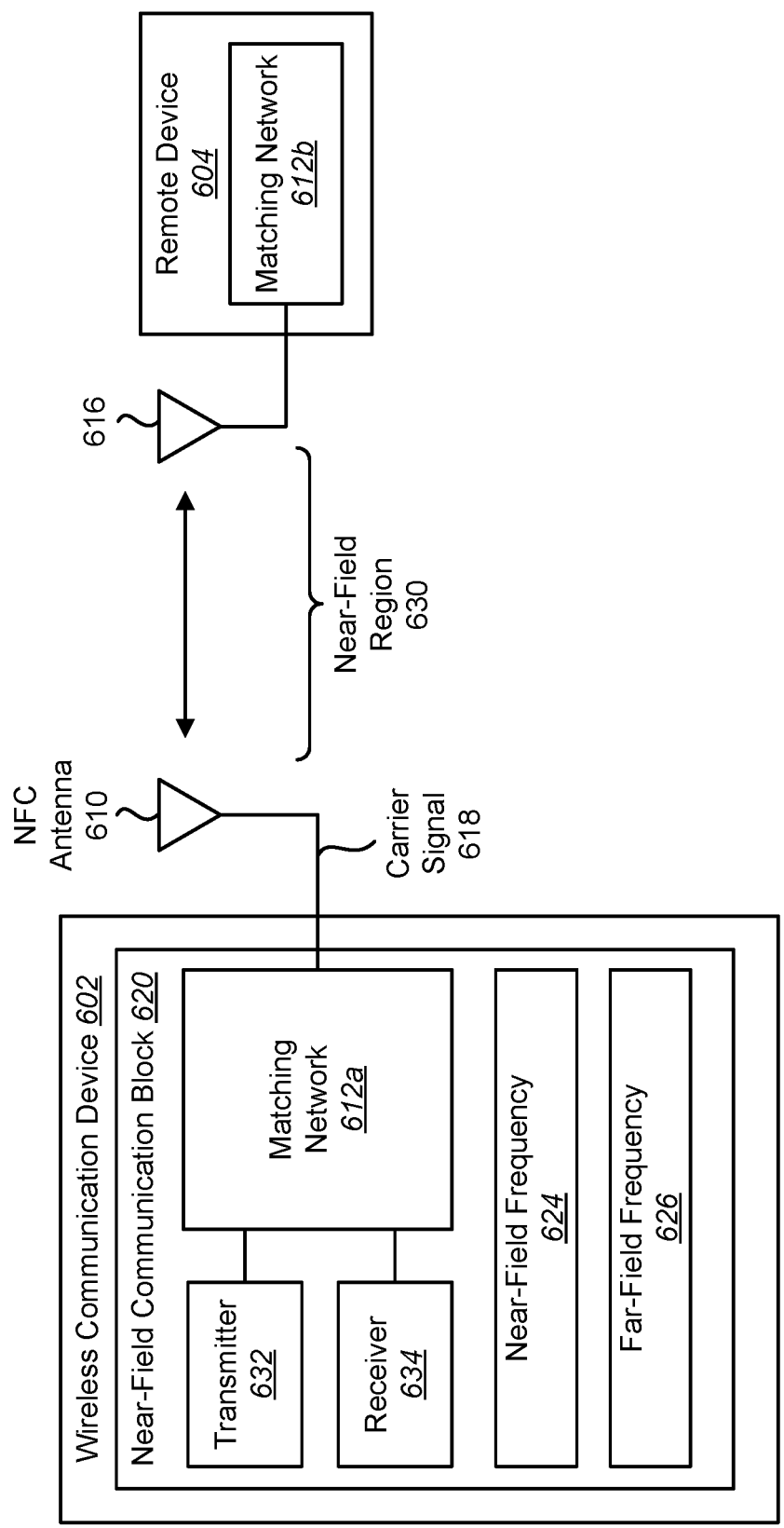
FIG. 6 is a block diagram illustrating one example of a wireless communication device configured for near-field communication using an NFC antenna.

FIG. 6 is a block diagram illustrating one example of a wireless communication device 602 configured for near-field communication using an NFC antenna 610. The wireless communication device 602 may include an NFC block 620 that includes a transmitter 632 and a receiver 634 coupled to a matching network 612a. The matching network 612a may be coupled to an NFC antenna 610, which may send and receive signals. The matching network 612a may have an impedance that produces a resonant peak within the antenna circuitry.

The transmitter 632 may generate a carrier signal 618. The carrier signal 618 may have a near-field frequency 624 (e.g., 13.56 MHz) for communicating with a remote device in the near-field region 630. Alternatively, the carrier signal 618 may have a far-field frequency 626 for communicating with a remote device outside the near-field region 630. The far-field frequency 626 may be greater than the near-field frequency 624.

The remote device may be an RFID tag or an NFC device. The remote device may include an antenna 616 and a matching network 612b.

In this example, the wireless communication device 602 may perform near-field communication (NFC) with the remote device in the near-field region 630. Therefore, the transmitter 632 may generate a carrier signal 618 with the NFC frequency of 13.56 MHz. In this case, the wireless communication device 602 may be inductively coupled with the remote device.

During communication with the remote device, the wireless communication device 602 and the remote device may perform carrier modulation. The wireless communication device 602 may use the 13.56 MHz carrier signal 618 for communication and power transfer with the remote device. For example, the wireless communication device 602 may modulate its own outgoing carrier signal 618 to send a message. The remote device may passively or actively load modulate this incoming carrier signal 618, and thus respond with a load modulation signal. The remote device may also take a turn at transmitting its own carrier signal 618, which it modulates to send a message back to the wireless communication device 602.

Figure 7:
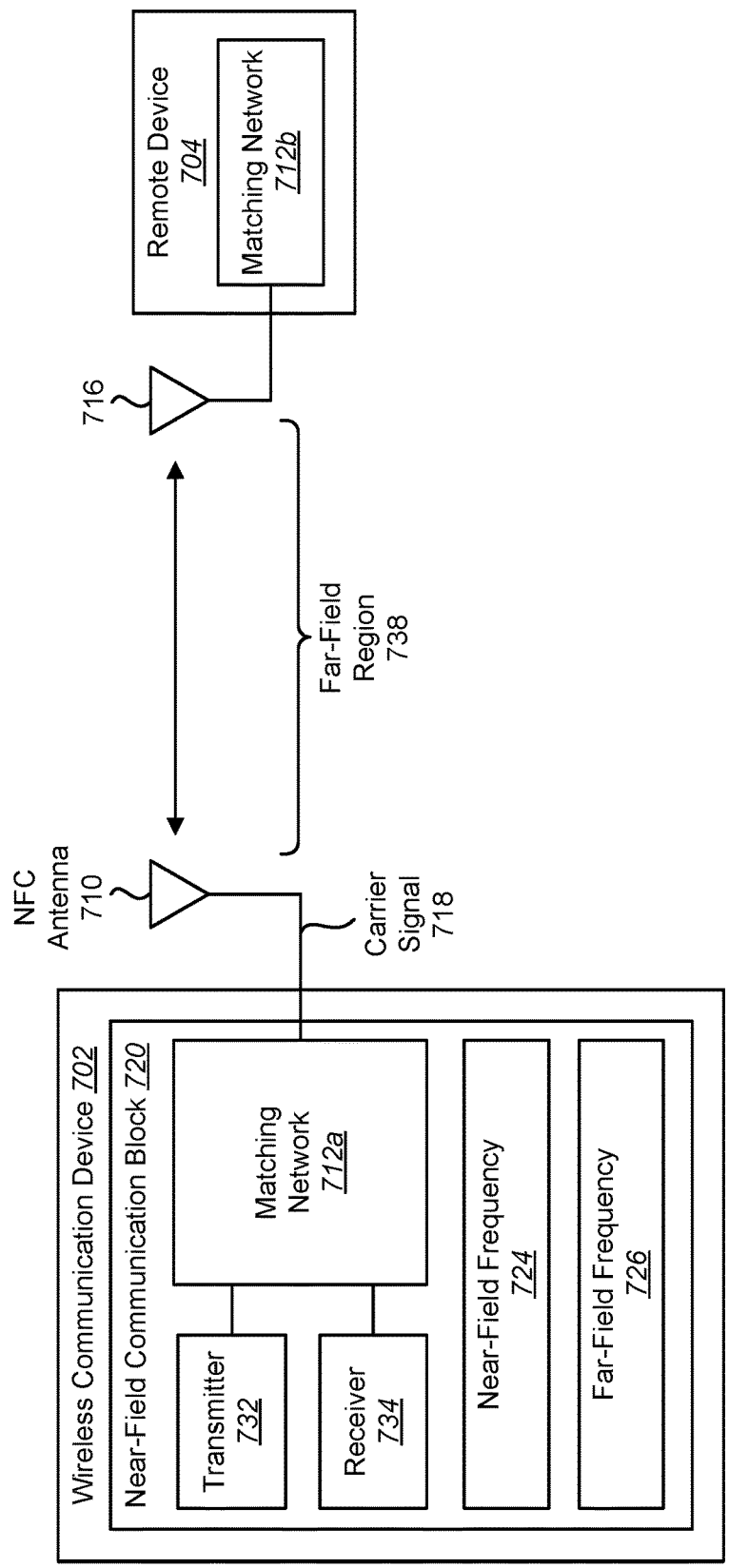
FIG. 7 is a block diagram illustrating another example of a wireless communication device configured for far-field communication using an NFC antenna.

FIG. 7 is a block diagram illustrating another example of a wireless communication device 702 configured for far-field communication using an NFC antenna 710. The wireless communication device 702 may include an NFC block 720 that includes a transmitter 732 and a receiver 734 coupled to a matching network 712a. The matching network 712a may be coupled to an NFC antenna 710, which may send and receive signals.

The transmitter 732 may generate a carrier signal 718. The carrier signal 718 may have a near-field frequency 724 (e.g., 13.56 MHz) for communicating with a remote device 704 in a near-field region 630. Alternatively, the carrier signal 718 may have a far-field frequency 726 for communicating with a remote device 704 in a far-field region 738. The far-field frequency 726 may be greater than the near-field frequency 724.

The remote device 704 may be an RFID tag or an NFC device. The remote device 704 may include an antenna 716 and a matching network 712b.

In this example, the wireless communication device 702 may perform far-field communication with the remote device 704 in the far-field region 738. Therefore, the transmitter 732 may generate a carrier signal 718 with a far-field frequency 726. For example, the carrier frequency may be 27.12 MHz, 40.68 MHz, 433.92 MHz, 915 MHz or 2.45 GHz. Similarly, the receiver 734 may receive a carrier signal 718 with a far-field frequency 726. Because the remote device 704 is in the far-field region 738, the wireless communication device 702 may not be inductively coupled with the remote device 704.

During communication with the remote device 704, the wireless communication device 702 and the remote device 704 may perform carrier modulation as described above. The remote device 704 may be tuned to use the far-field frequency 726. Therefore, the remote device 704 may send and receive a carrier signal 718 using the far-field frequency 726.

Figure 8:
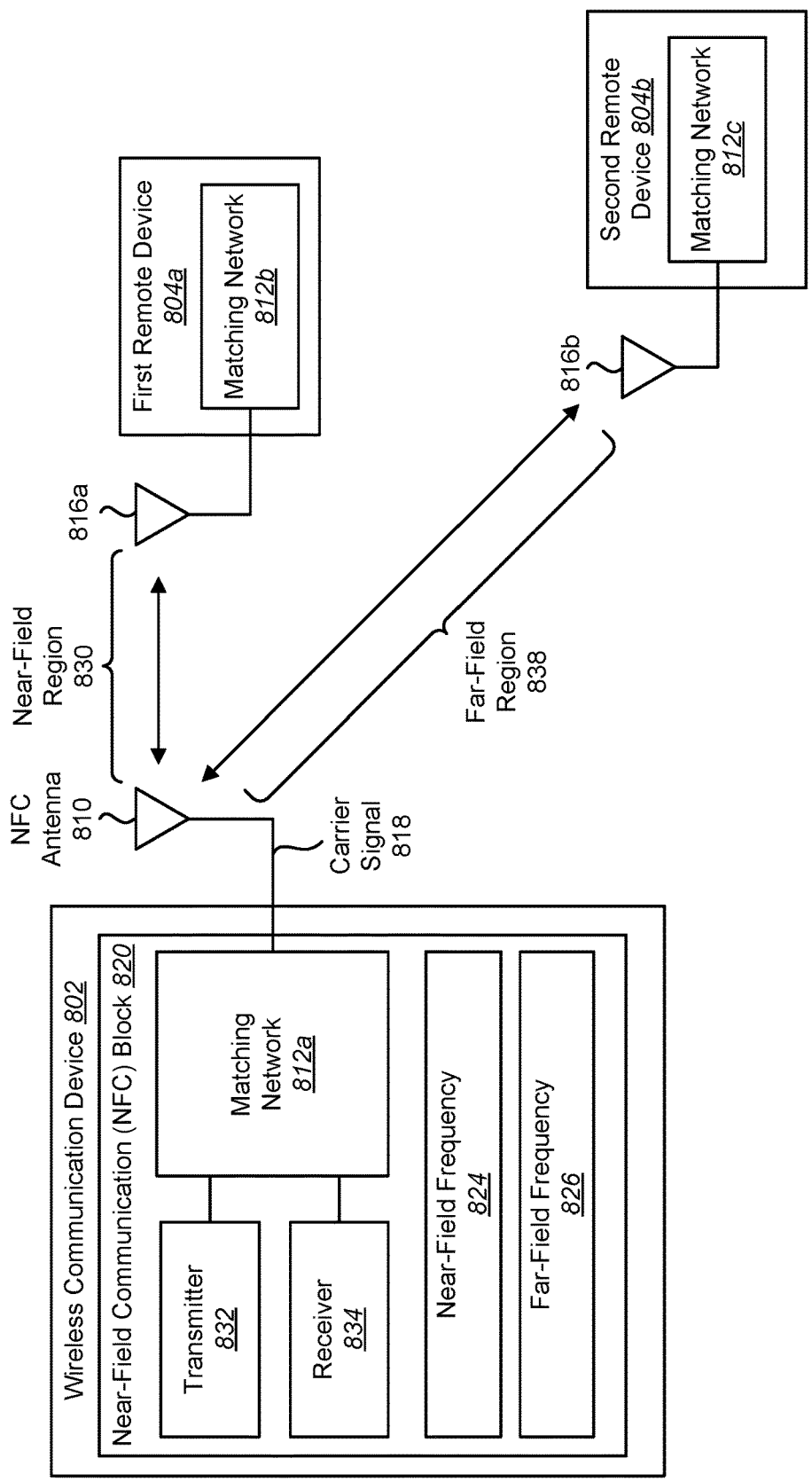
FIG. 8 is a block diagram illustrating yet another example of a wireless communication device configured for far-field communication using an NFC antenna.

FIG. 8 is a block diagram illustrating yet another example of a wireless communication device 802 configured for far-field communication using an NFC antenna 810. The wireless communication device 802 may include an NFC block 820 that includes a transmitter 832 and a receiver 834 coupled to a matching network 812a. The matching network 812a may be coupled to an NFC antenna 810, which may send and receive signals.

A first remote device 804a may be located in a near-field region 830. The first remote device 804a may include a matching network 812b. A second remote device 804b may be located in a far-field region 838. The second remote device 804b may include a matching network 812c. The remote devices 804 may be RFID tags or NFC devices.

In this example, the wireless communication device 802 may perform concurrent communication with the first remote device 804a and the second remote device 804b. The wireless communication device 802 may perform near-field communication (NFC) with the first remote device 804a in the near-field region. Therefore, the transmitter 832 may generate a carrier signal 818 with the NFC frequency 824 of 13.56 MHz for communication with the first remote device 804a. Similarly, the receiver 834 may receive a 13.56 MHz carrier signal 818 from the first remote device 804a.

The wireless communication device 802 may also perform far-field communication with the second remote device 804b using the NFC antenna circuitry. Therefore, the transmitter 832 may generate a carrier signal 818 with a far-field frequency 826 greater than the near-field frequency 824. Similarly, the receiver 834 may receive a carrier signal 818 from the second remote device 804b with a far-field frequency 826.

Figure 9:
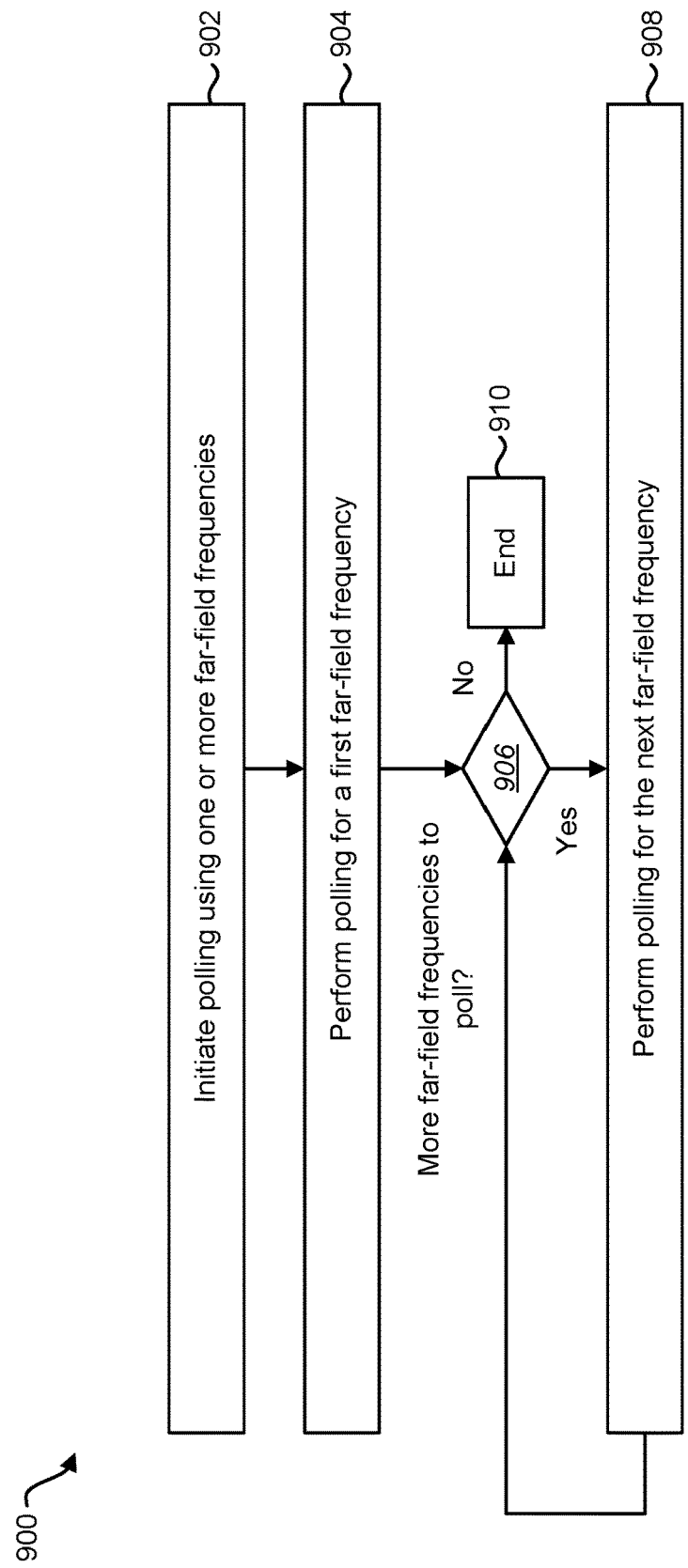
FIG. 9 is a flow diagram illustrating a method for performing a polling frequency sweep using frequencies outside the near-field.

FIG. 9 is a flow diagram illustrating a method 900 for performing a polling frequency sweep using frequencies outside the near-field. The method 900 may be performed by a wireless communication device 502. The wireless communication device 502 may be configured with NFC circuitry. The NFC circuitry may include an NFC controller (e.g., NFC block 520) and NFC antenna circuitry (e.g., an NFC antenna 510 and matching network 512).

The wireless communication device 502 may initiate 902 polling using one or more far-field frequencies 526. The far-field frequencies 526 may be greater than a near-field frequency 524 (e.g., 13.56 MHz). The wireless communication device 502 may be configured to poll on one or more far-field frequencies 526. For example, the wireless communication device 502 may include a list of far-field frequencies 526 on which to poll.

The wireless communication device 502 may perform 904 polling for a first far-field frequency 526. The wireless communication device 502 may poll one or more remote devices 504 operating at the far-field frequencies 526. For example, the first far-field frequency 526 may be 27.12 MHz. Therefore, the wireless communication device 502 may poll for remote devices that communicate using 27.12 MHz. The wireless communication device 502 may perform the polling using the NFC antenna circuitry.

Upon completing the polling for the first far-field frequency 526, the wireless communication device 502 may determine 906 whether there are more far-field frequencies 526 to poll. If there are one or more additional far-field frequencies 526 to poll, the wireless communication device 502 may perform 908 polling for the next far-field frequency 526. For example, the next far-field frequency may be 40.68 MHz. Therefore, the wireless communication device 502 may poll for remote devices 504 that communicate using 40.68 MHz.

The wireless communication device 502 may then again determine 906 whether there more far-field frequencies 526 to poll. When there are no more far-field frequencies 526 to poll, the method 900 may end 910.

Figure 10:
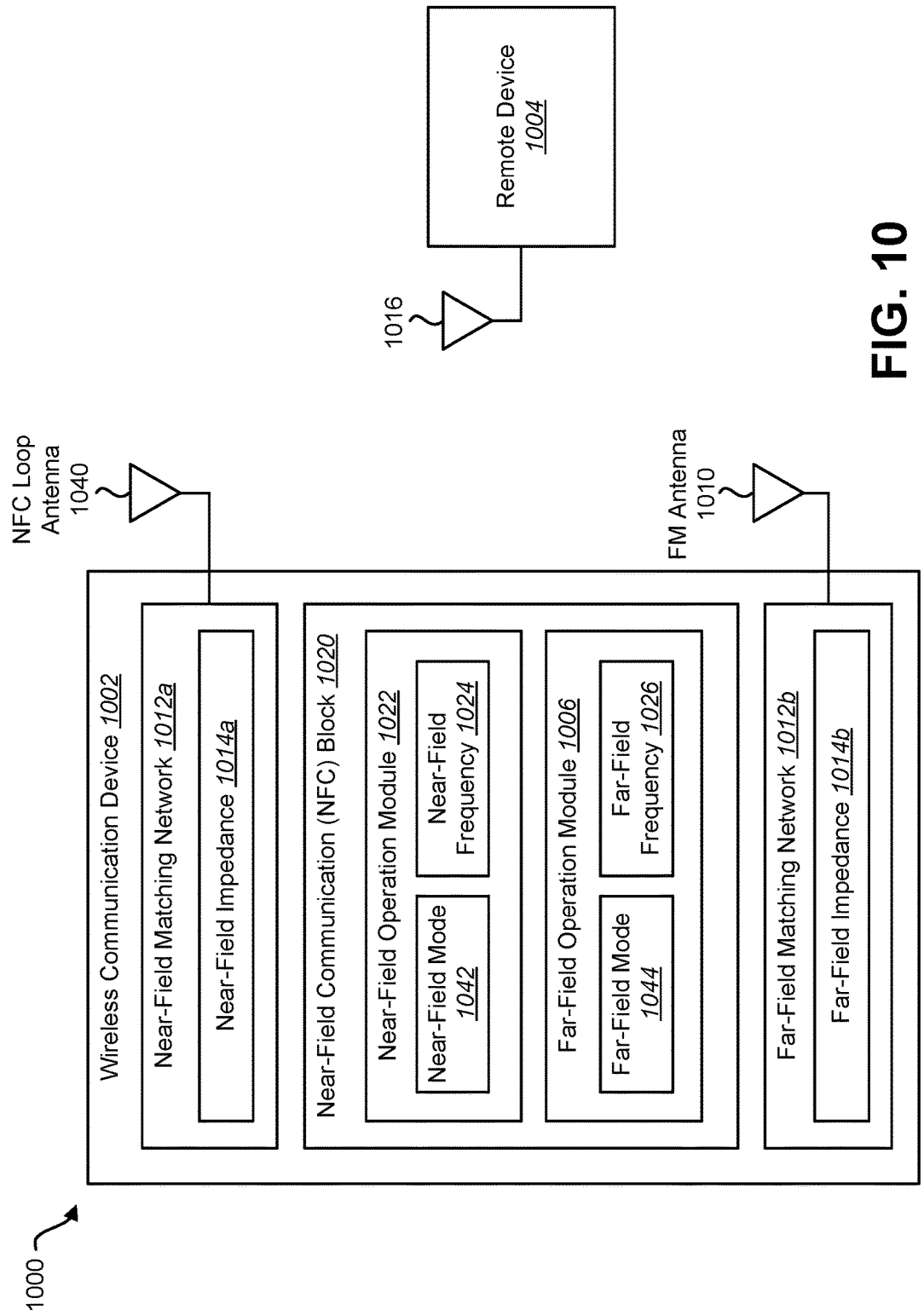
FIG. 10 is a block diagram illustrating one configuration of a wireless communication system for performing NFC-type operations in the far-field region using an FM antenna.

FIG. 10 is a block diagram illustrating one configuration of a wireless communication system 1000 for performing NFC-type operations in the far-field region using an FM antenna 1010. The wireless communication system 1000 may include a wireless communication device 1002 that is in communication with a remote device 1004. The wireless communication device 1002 may be implemented in accordance with the wireless communication device 102 described in connection with FIG. 1.

In this implementation, the wireless communication device 1002 may repurpose an FM antenna 1010 to perform NFC-type operations in the far-field region. The NFC-configured wireless communication device 1002 may leverage the fact that an FM radio antenna structure is physically (and electrically) long with respect to higher frequency wave lengths. The FM antenna 1010 may be implemented as part of a headphone cable that attaches to the wireless communication device 1002.

During wireless communication with the remote device 1004, the wireless communication device 1002 may transmit or receive a signal operating outside of the near-field region using the FM antenna 1010. The signal may be a carrier signal that has a carrier frequency greater than 13.56 megahertz (MHz). The remote device 1004 may be a tag (e.g., RFID tag or NFC tag) or an NFC-equipped handset device that is also configured to operate outside the near-field region. The remote device 1004 may include an antenna 1016.

For far-field frequencies 1026, the wireless communication device 1002 may transmit and receive off-tune from 13.56 MHz for the FM antenna 1010 with an associated impedance match. The FM antenna 1010 may be coupled to a far-field matching network 1012b that is configured to resonate at a far-field frequency 1026. In one implementation, the FM antenna 1010 may also be coupled to a diplexer. The diplexer may allow the wireless communication device 1002 to share the FM antenna 1010 with the NFC block 1020 and an FM receiver (not shown).

NFC operation may be achieved in the near-radiating (e.g., Fresnel), transition (e.g., from reactive to radiating), or even into radiating (e.g., far-field region) electromagnetic regions. As used herein, the near-radiating region, transition region and radiating region are collectively referred to as the far-field region. Therefore, as used herein, far-field communication includes wireless communication in the near-radiating region, transition region or radiating region.

Because the FM antenna 1010 may be used for NFC in the far-field region, the communication range may be extended. This is because NFC-type operations in this case are not limited by reactive region coupling and associated near-field propagation losses. In other words, the wireless communication device 1002 may use the FM antenna 1010 to implement radio frequency (RF) communication to perform NFC-type operations in the far-field.

The described systems and methods can be used to enable communication between readers (e.g., NFC-equipped handsets) and tags that operate at a near field frequency, a far-field frequency 1026 or both. As used herein, the near-field frequency 1024 is approximately 13.56 MHz. It should be noted that in one configuration, these far-field frequencies 1026 may be harmonics of the 13.56 MHz NFC frequency. In another configuration, these far-field frequencies 1026 need not be harmonics of the 13.56 MHz NFC frequency.

In one implementation, the wireless communication device 1002 may include an NFC block 1020, an NFC loop antenna 1040, a near-field matching network 1012a, an FM antenna 1010 and a far-field matching network 1012b. The NFC loop antenna 1040 may be a loop or coil antenna. The near-field matching network 1012a may have a certain impedance (i.e., near field impedance 1014a) that is configured to produce resonance in the NFC loop antenna 1040 at the near-field frequency 1024 (e.g., 13.56 MHz).

The FM antenna 1010 may be implemented as headphones or another FM radio antenna structure configured to receive and/or send FM signals. The far-field matching network 1012b may have a far-field impedance 1014b that is configured to produce resonance in the FM antenna 1010 at the far-field frequency 1026.

In one configuration, the NFC block 1020 may be an NFC controller. The NFC block 1020 may include a near-field operation module 1022 and a far-field operation module 1006. The wireless communication device 1002 may switch between the NFC loop antenna 1040 for near field operation and the FM antenna 1010 for far-field (e.g., far-field) operation. The wireless communication device 1002 may have a mode of operation for near-field communication (i.e., near-field mode 1042) and another mode of operation for far-field communication (i.e., far-field mode 1044).

In near-field mode 1042, the wireless communication device 1002 may perform NFC-type operations using the NFC loop antenna 1040 and the near-field frequency 1024. For example, the wireless communication device 1002 may transmit or receive a carrier signal at the near-field frequency 1024 of 13.56 MHz. While in near-field mode 1042, the NFC loop antenna 1040 of the wireless communication device 1002 may be inductively coupled with the antenna of the remote device 1004.

In far-field mode 1044, the wireless communication device 1002 may switch to performing NFC-type operations using the FM antenna 1010 and a far-field frequency 1026. While in far-field mode 1044, the wireless communication device 1002 may generate a carrier frequency at a far-field frequency 1026 that is greater than the near-field frequency 1024 (e.g., 13.56 MHz). The wireless communication device 1002 may use the FM antenna 1010 to send and receive NFC-type signals in the far-field region.

The far-field matching network 1012b may be configured with a far-field impedance 1014b that produces resonance in the FM antenna 1010 at the far-field frequency 1026. In this implementation, the far-field impedance 1014b may be optimized for the far-field frequency 1026. The far-field impedance 1014b may produce a resonant peak that coincides with the far-field frequency 1026.

The remote device 1004 may be similarly tuned to operate outside of the near-field region. For example, the remote device 1004 may be configured to use antenna circuitry to receive and transmit a far-field carrier signal. Thus, the wireless communication device 1002 may add far-field communication capability to NFC-type operations.

It should be noted that both a near-field carrier (e.g., 13.56 MHz) and a far-field carrier can be used for both read and write operations. In one implementation, the wireless communication device 1002 may perform concurrent NFC-type operations for near-field mode 1042 and far-field mode 1044. In concurrent wireless communication, the wireless communication device 1002 may perform both normal NFC communications (using the near-field frequency 1024 and NFC loop antenna 1040) and NFC-type operations outside of a near-field region (using one or more far-field frequencies 1026 and the FM antenna 1010).

A near-field carrier and a far-field carrier may be used for both read and write operations. For example, the wireless communication device 1002 may communicate with a first remote device 1004 using a carrier signal with a far-field frequency 1026. The wireless communication device 1002 may concurrently communicate with a second remote device 1004 using a carrier signal with a near-field frequency 1024.

In another implementation, the wireless communication device 1002 may perform read and write operations with a first remote device 1004 using a far-field frequency 1026 at a separate time than read and write operations with a second remote device 1004 using a near-field frequency 1024. In this implementation, the wireless communication device 1002 may transmit or receive far-field carrier signals at separate times for near-field mode 1042 and far-field mode 1044.

The wireless communication device 1002 may operate in multiple modes for different far-field frequencies 1026. In one configuration, the far-field operation module 1006 may be configured to perform wireless communication using multiple far-field frequencies 1026. For example, the far-field operation module 1006 may perform NFC-type operations with one or more remote devices 1004 using 27.12 MHz, 40.68 MHz, 433.92 MHz, 915 MHz or 2.45 GHz carrier frequencies.

The described systems and methods will result in NFC-type operations outside the near-field region. Therefore, the range of NFC may be extended. The described systems and methods may maintain the existing NFC circuitry (e.g., near-field matching network 1012a and NFC loop antenna 1040) for near-field operations. However, further optimization may be achieved by using the FM antenna 1010 and far-field matching network 1012b for far-field operations. Additionally, because the communication between the wireless communication device 1002 and the remote device 1004 occurs outside the near-field region, the communication is less susceptible to interference due to magnetic coupling.

Figure 11:
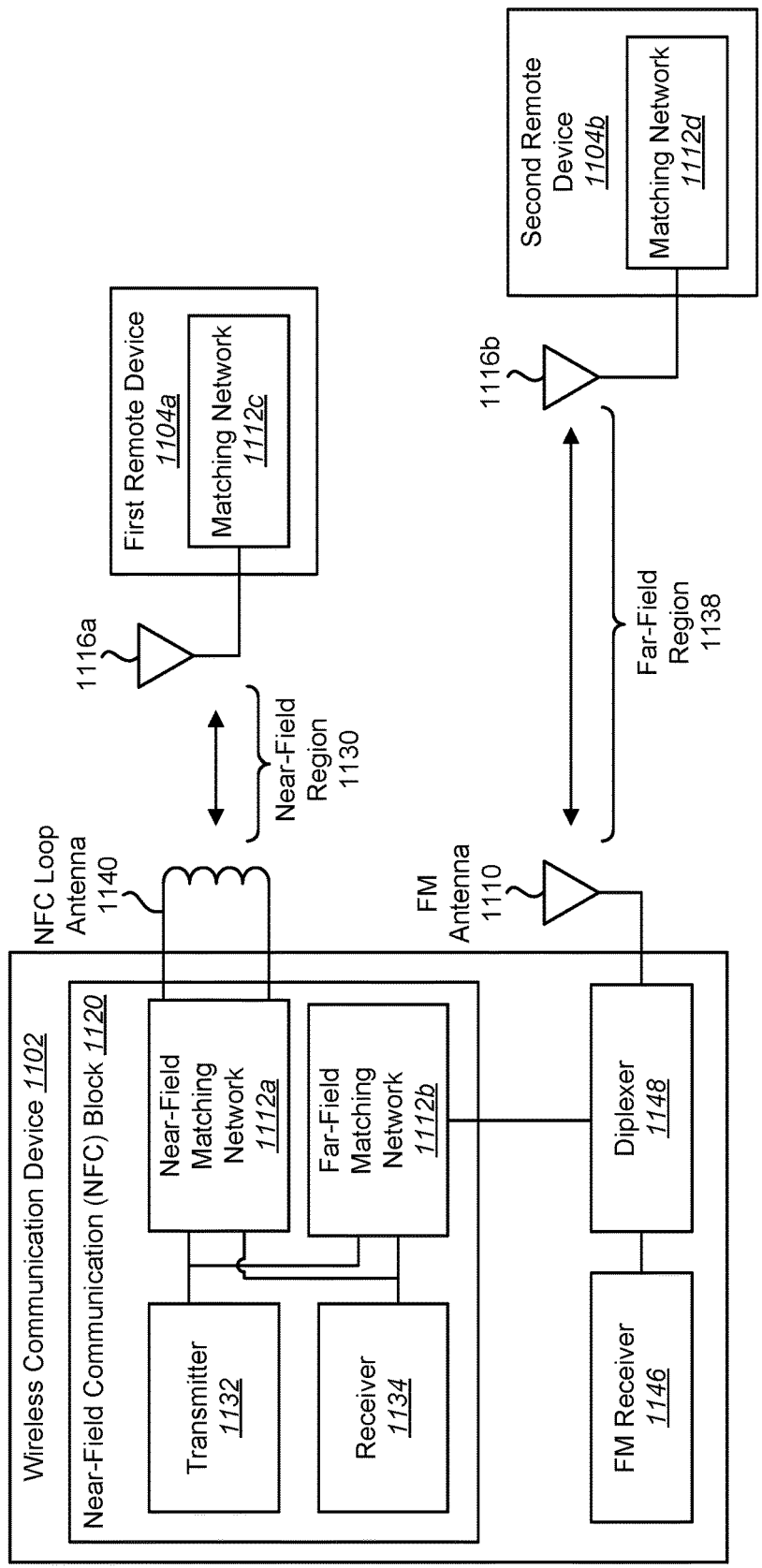
FIG. 11 is a block diagram illustrating one example of a wireless communication device configured for NFC-type operations in the far-field region using a repurposed FM antenna.

FIG. 11 is a block diagram illustrating one example of a wireless communication device 1102 configured for NFC-type operations in the far-field region using a repurposed FM antenna 1110. The wireless communication device 1102 may include an NFC block 1120 and an FM receiver 1146.

The NFC block 1120 may include a transmitter 1132 and a receiver 1134 for sending and receiving NFC signals. The transmitter 1132 may be coupled to a near-field matching network 1112a and a far-field matching network 1112b. The receiver 1134 may also be coupled to the near-field matching network 1112a and the far-field matching network 1112b.

The near-field matching network 1112a may be coupled to an NFC loop antenna 1140. The near-field matching network 1112a may be configured with an impedance 1114a (e.g., near-field impedance 1114a) that produces resonance in the NFC loop antenna 1140 at the near-field frequency 1024 (e.g., 13.56 MHz).

The far-field matching network 1112b may be coupled to a diplexer 1148. The diplexer 1148 may allow the FM receiver 1146 and the NFC block 1120 to share an FM antenna 1110. In one implementation, the FM antenna 1110 may be a headphone cable attached to the wireless communication device 1102.

The wireless communication device 1102 may communicate with a remote device 1104 using NFC-type operations. For example, the transmitter 1132 may generate a carrier signal for transmission to a remote device 1104. The receiver 1134 may receive a carrier signal from a remote device 1104. The remote device 1104 may be an RFID tag or an NFC device. The remote device 1104 may include an antenna 1116 and a matching network 1112.

When the wireless communication device 1102 is in a near-field mode 1042, the wireless communication device 1102 may perform NFC-type operations inside the near-field region using the NFC loop antenna 1140. For example, the wireless communication device 1102 may send or receive a carrier signal that has a near-field frequency 1024 (e.g., 13.56 MHz) for communicating with a first remote device 1104a in a near-field region 1130. In this case, the antenna 1116a and matching network 1112c of the first remote device 1104a may be tuned for NFC-type operations in the near-field region. The wireless communication device 1102 may be inductively coupled with the first remote device 1104a.

When the wireless communication device 1102 is in a far-field mode 1044, the wireless communication device 1102 may perform NFC-type operations outside the near-field region using the FM antenna 1110. For example, the wireless communication device 1102 may send or receive a carrier signal that has a far-field frequency 1026 for communicating with a second remote device 1104*b* in the far-field region 1138. In this case, the antenna 1116*b* and matching network 1112*d* of the second remote device 1104*b* may be tuned for NFC-type operations in the far-field region 1138. The far-field frequency 1026 may be greater than the near-field frequency 1024.

Figure 12:
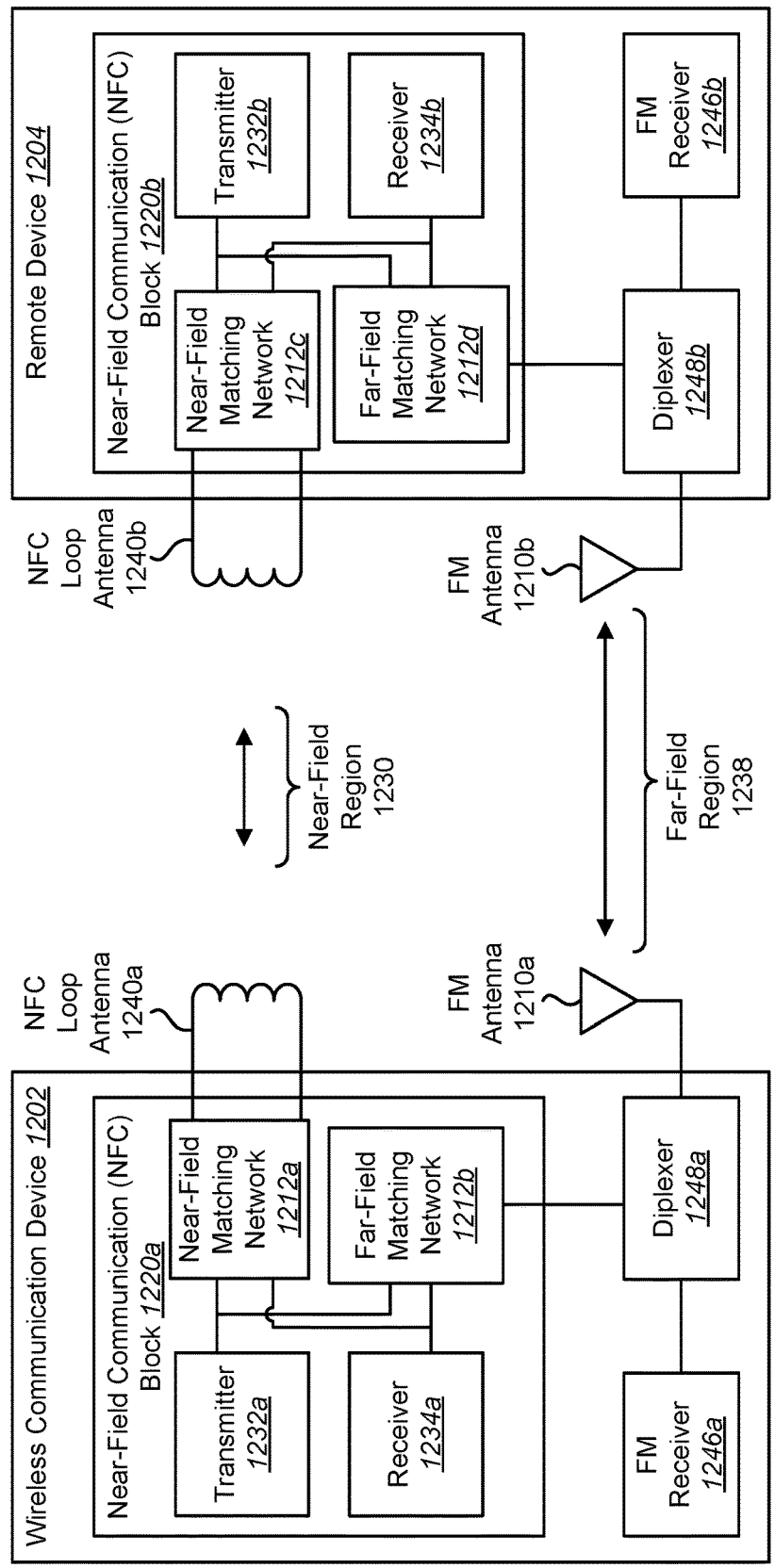
FIG. 12 is a block diagram illustrating another example of a wireless communication device configured for NFC-type operations in the far-field region using a repurposed FM antenna.

FIG. 12 is a block diagram illustrating another example of a wireless communication device 1202 configured for NFC-type operations in the far-field region 1238 using a repurposed FM antenna 1210*a*. The wireless communication device 1202 may communicate with a remote device 1204 using NFC-type operations.

The wireless communication device 1202 may include an NFC block 1220, transmitter 1232*a*, receiver 1234*a*, near-field matching network 1212*a*, NFC loop antenna 1240*a*, far-field matching network 1212*b*, FM receiver 1246*a*, diplexer 1248*a* and FM antenna 1210*a*, as described above in connection with FIG. 11. The remote device 1204 may also include an NFC block 1220*b*, transmitter 1232*b*, receiver 1234*b*, near-field matching network 1212*c*, NFC loop antenna 1240*b*, far-field matching network 1212*d*, FM receiver 1246*b*, diplexer 1248*b* and FM antenna 1210*b*, as described above in connection with FIG. 11.

The wireless communication device 1202 may communicate with the remote device 1204 using NFC-type operations. For example, the transmitter 1232*a* may generate a carrier signal for transmission to the remote device 1204. The receiver 1234*a* may receive a carrier signal from the remote device 1204.

When the wireless communication device 1202 and the remote device 1204 are within the near-field region 1230, the wireless communication device 1202 and the remote device 120 may operate in a near-field mode 1042. In this case, the wireless communication device 1202 and the remote device 120 may be inductively coupled. When the wireless communication device 1202 is in a near-field mode 1042, the wireless communication device 1202 may perform NFC-type operations inside the near-field region 1230 using its NFC loop antenna 1240*a*. Similarly, the remote device 1204 may also perform NFC-type operations inside the near-field region 1230 using its NFC loop antenna 1240*b*.

When the wireless communication device 1202 and the remote device 1204 are within the far-field region 1238, the wireless communication device and the remote device may operate in a far-field mode 1044. When the wireless communication device 1202 is in far-field mode 1044, the wireless communication device 1202 may perform NFC-type operations outside the near-field region 1230 using its FM antenna 1210*a*. Similarly, the remote device 1204 may also perform NFC-type operations outside the near-field region 1230 using its FM antenna 1210*b*.

Figure 13:
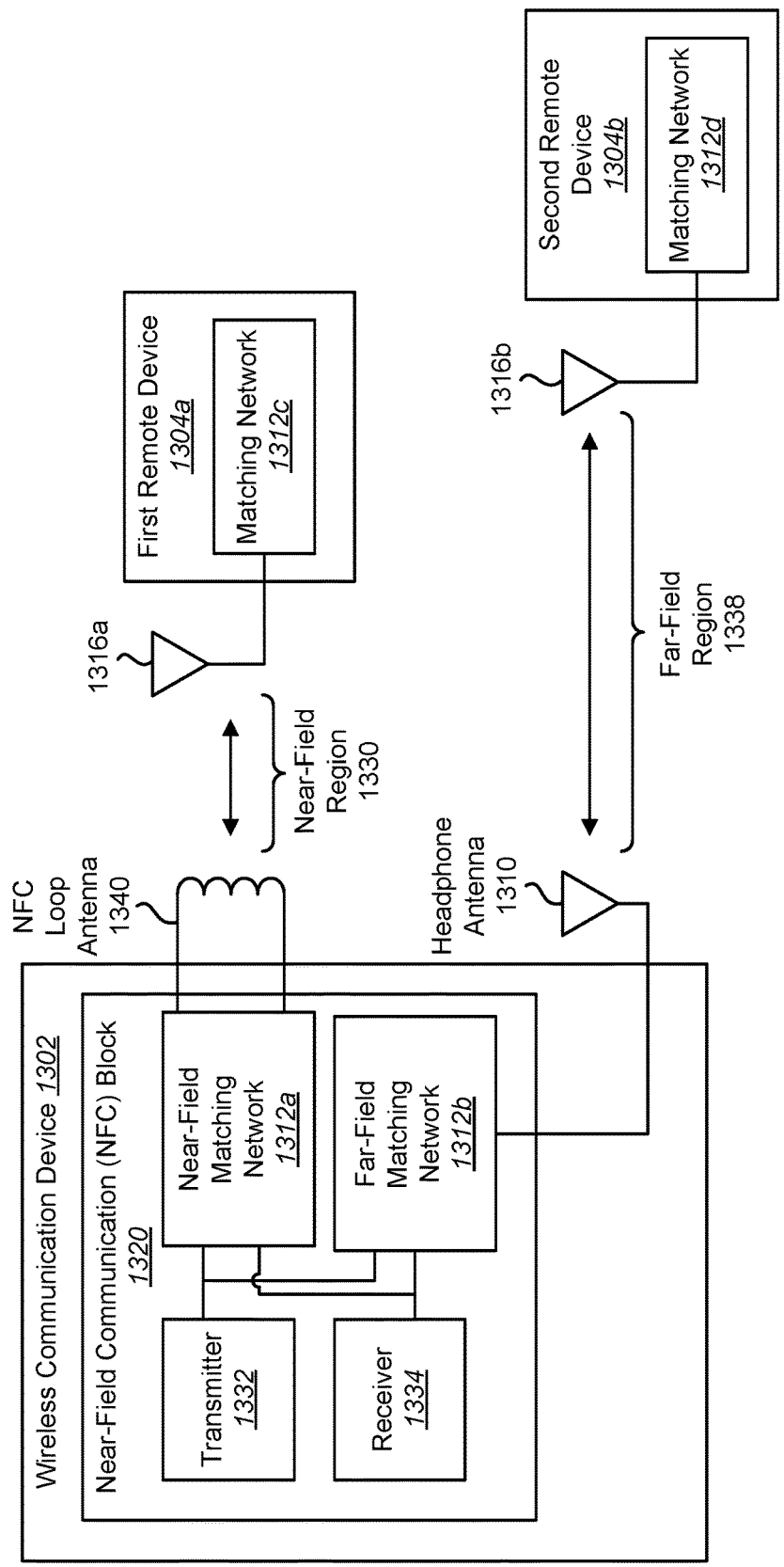
FIG. 13 is a block diagram illustrating an example of a wireless communication device configured for NFC-type operations in the far-field region using a headphone antenna.

FIG. 13 is a block diagram illustrating an example of a wireless communication device 1302 configured for NFC-type operations in the far-field region 1338 using a headphone antenna 1310. In this case, the wireless communication device 1302 may perform NFC-type operations using a repurposed headphone antenna 1310 without an FM radio.

The wireless communication device 1302 may include an NFC block 1320, transmitter 1332, receiver 1334, near-field matching network 1312*a*, NFC loop antenna 1340, and far-field matching network 1312*b*, as described above in connection with FIG. 11. In this example, the wireless communication device 1302 does not include an FM receiver 1146. However, the wireless communication device 1302 may use a headphone antenna 1310 (e.g., headphone cable) as an FM antenna even without an FM radio.

The wireless communication device 1302 may communicate with a remote device 1304 using NFC-type operations, as described in connection with FIG. 11. The remote device 1304 may be an RFID tag or an NFC device. The remote device 1304 may include an antenna 1316 and a matching network 1312.

When the wireless communication device 1302 is in a near-field mode 1042, the wireless communication device 1302 may perform NFC-type operations inside the near-field region 1330 using the NFC loop antenna 1340. For example, the wireless communication device 1302 may send or receive a carrier signal that has a near-field frequency 1024 (e.g., 13.56 MHz) for communicating with a first remote device 1304*a* in a near-field region 1330. In this case, the antenna 1316*a* and matching network 1312*c* of the first remote device 1304*a* may be tuned for NFC-type operations in the near-field region 1330. The wireless communication device 1302 may be inductively coupled with the first remote device 1304*a*.

When the wireless communication device 1302 is in a far-field mode 1044, the wireless communication device 1302 may perform NFC-type operations outside the near-field region 1330 using the headphone antenna 1310. For example, the wireless communication device 1302 may send or receive a carrier signal that has a far-field frequency 1026 for communicating with a second remote device 1304*b* in the far-field region 1338. In this case, the antenna 1316*b* and matching network 1312*d* of the second remote device 1304*b* may be tuned for NFC-type operations in the far-field region 1338. The far-field frequency 1026 may be greater than the near-field frequency 1024.

Figure 14:
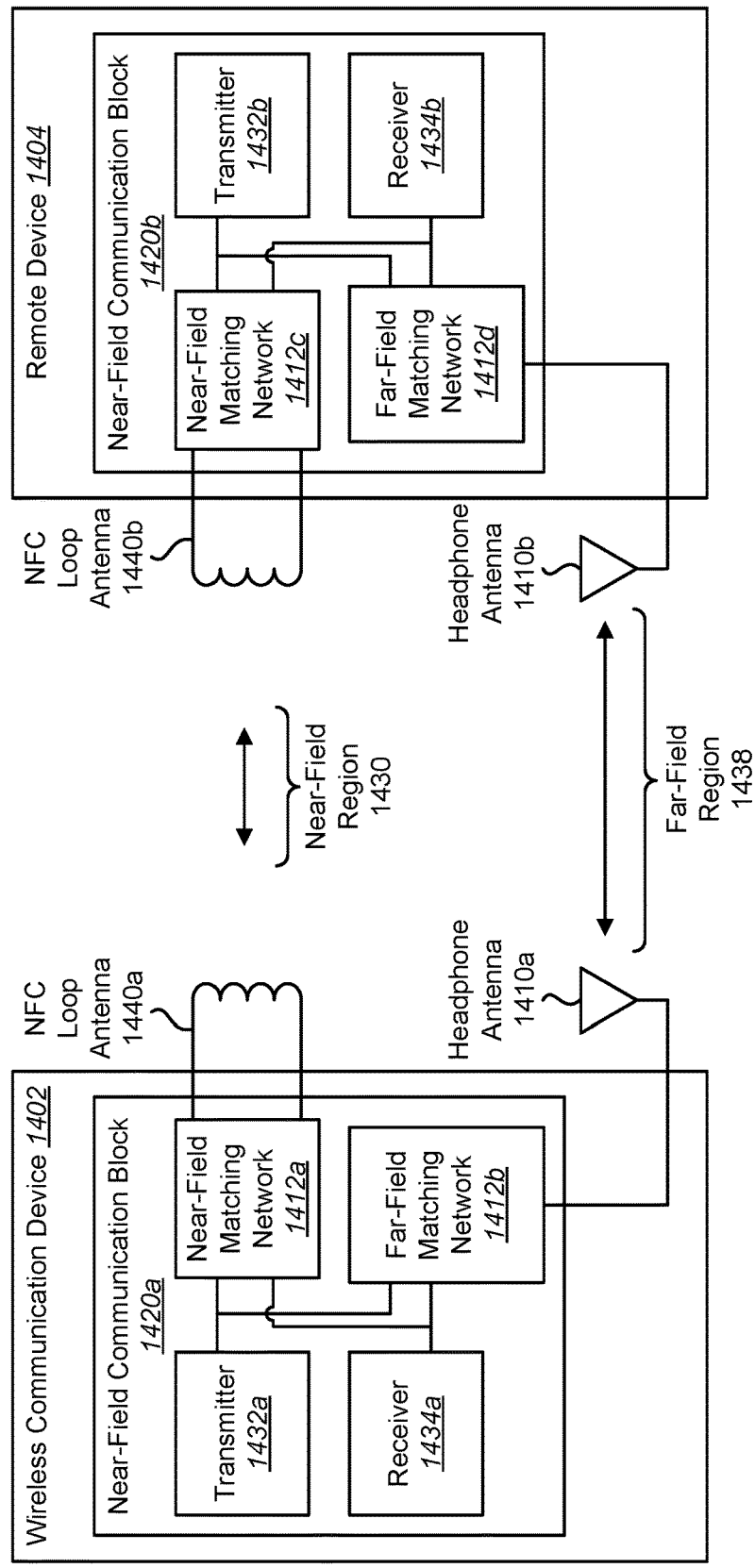
FIG. 14 is a block diagram illustrating another example of a wireless communication device configured for NFC-type operations in the far-field region using a headphone antenna.

FIG. 14 is a block diagram illustrating another example of a wireless communication device 1402 configured for NFC-type operations in the far-field region 1438 using a headphone antenna 1410*a*. In this case, the wireless communication device 1402 may perform NFC-type operations using a headphone antenna 1410*a* without an FM radio.

The wireless communication device 1402 may include an NFC block 1420*a*, transmitter 1432*a*, receiver 1434*a*, near-field matching network 1412*a*, NFC loop antenna 1440*a*, and far-field matching network 1412*b*, as described above in connection with FIG. 11. In this example, the wireless communication device 1402 does not include an FM receiver 1146. However, the wireless communication device 1402 may use a headphone antenna 1410*a* (e.g., headphone cable) as an FM antenna even without an FM radio.

Similarly, the remote device 1404 may also include an NFC block 1420*b*, transmitter 1432*b*, receiver 1434*b*, near-field matching network 1412*c*, NFC loop antenna 1440*b*, and far-field matching network 1412*d*, as described above in connection with FIG. 11. The remote device 1404 may also include a headphone antenna 1410*b*.

When the wireless communication device 1402 and the remote device 1404 are within the near-field region 1430, the wireless communication device 1402 and the remote device 1404 may operate in a near-field mode 1042. In this case, the wireless communication device 1402 and the remote device 1404 may be inductively coupled. When the wireless communication device 1402 is in a near-field mode 1042, the wireless communication device 1402 may perform NFC-type operations inside the near-field region 1430 using its NFC loop antenna 1440*a*. Similarly, the remote device

1404 may also perform NFC-type operations inside the near-field region 1430 using its NFC loop antenna 1440b.

When the wireless communication device 1402 and the remote device 1404 are within the far-field region 1438, the wireless communication device 1402 and the remote device 1404 may operate in a far-field mode 1044. When the wireless communication device 1402 is in far-field mode 1044, the wireless communication device 1402 may perform NFC-type operations outside the near-field region 1430 using its headphone antenna 1410a. Similarly, the remote device 1404 may also perform NFC-type operations outside the near-field region 1430 using its headphone antenna 1410b.

Figure 15:
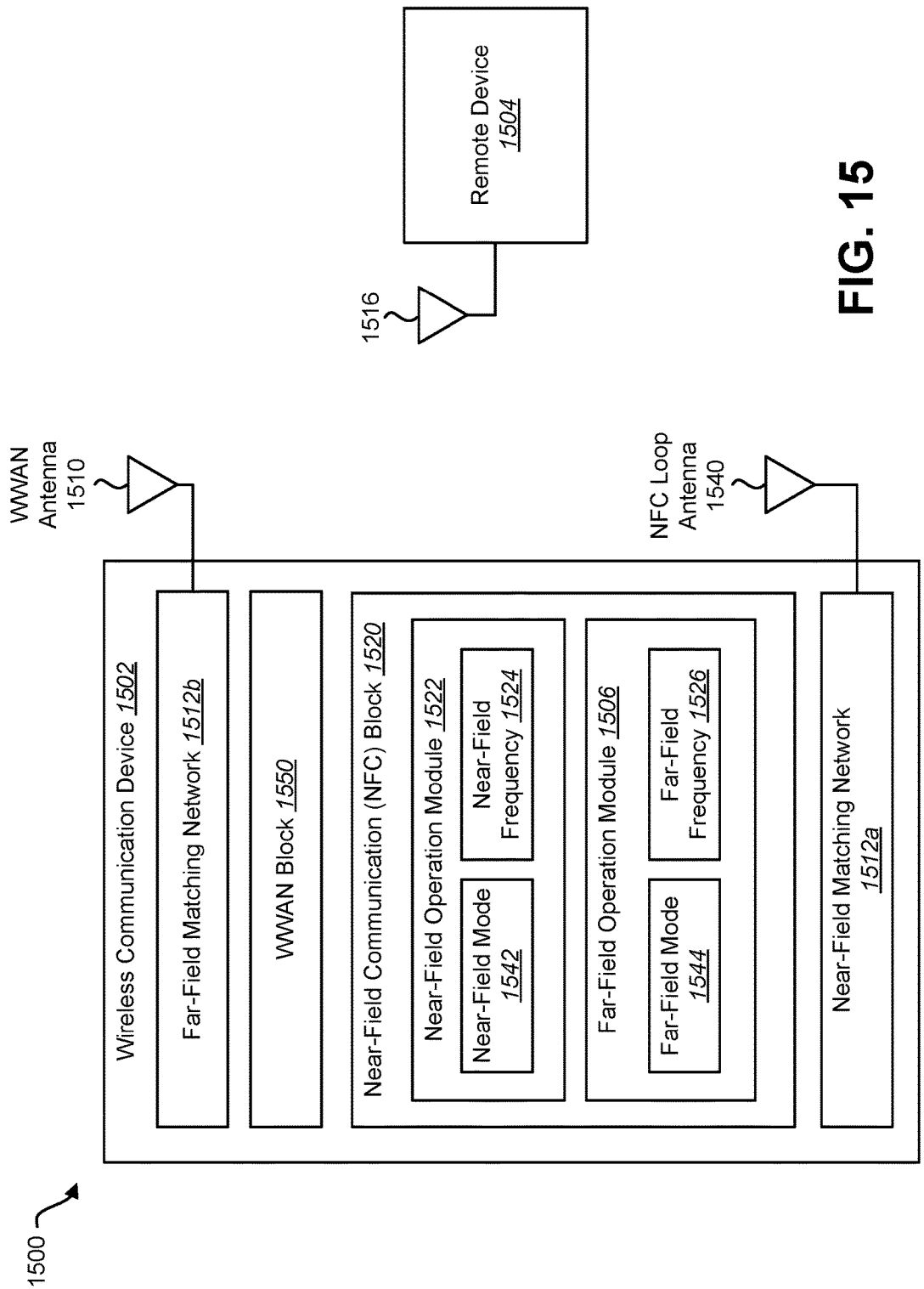
FIG. 15 is a block diagram illustrating one configuration of a wireless communication system for performing NFC-type operations in the far-field region using a repurposed wireless wide area network (WWAN) antenna.

FIG. 15 is a block diagram illustrating one configuration of a wireless communication system 1500 for performing NFC-type operations in the far-field region using a repurposed WWAN antenna 1510. The wireless communication system 1500 may include a wireless communication device 1502 that is in communication with a remote device 1504. The wireless communication device 1502 may be implemented in accordance with the wireless communication device 102 described in connection with FIG. 1.

In this implementation, the repurposed antenna 110 used for NFC-type operations in the far-field region may be a wireless wide area network (WWAN) antenna 1510 configured for cellular communication. The wireless communication device 1502 may include a WWAN block 1550. The WWAN block 1550 may perform cellular communication operations. WWAN may extend wireless coverage through the use of cellular communication using a cellular antenna and networks. In one implementation, WWAN may include WLAN technologies.

WWAN may operate in accordance with certain industry standards, such as Third Generation Partnership Project (3GPP) Long Term Evolution (LTE) standards. Other examples of standards that a communication device may comply with include Institute of Electrical and Electronics Engineers (IEEE) 802.11a, 802.11b, 802.11g, 802.11n and/or 802.11ac (e.g., Wireless Fidelity or "Wi-Fi") standards, IEEE 802.16 (e.g., Worldwide Interoperability for Microwave Access or "WiMAX") standards, Code Division Multiple Access (CDMA) 2000 1x (referred to herein as "1x", may also be referred to as IS-2000 or 1xRTT) standards, Evolution-Data Optimized (EVDO) standards, Interim Standard 95 (IS-95), High Data Rate (HDR), High Rate Packet Data (HRPD), evolved High Rate Packet Data (eHRPD), radio standards and others. WWAN may also include Wireless Metropolitan Area Networking (WMAN) standards and High-Speed Downlink Packet Access (HSDPA) standards. While some of the systems and methods disclosed herein may be described in terms of one or more standards, this should not limit the scope of the disclosure, as the systems and methods may be applicable to many systems and/or standards.

The terms "networks" and "systems" are often used interchangeably. A CDMA network may implement a radio access technology (RAT) such as Universal Terrestrial Radio Access (UTRA), CDMA2000, etc. UTRA includes W-CDMA and Low Chip Rate (LCR) while CDMA2000 covers IS-2000, IS-95 and IS-856 standards. A TDMA network may implement a radio access technology (RAT) such as Global System for Mobile Communications (GSM). An orthogonal frequency division multiple access (OFDMA) network may implement a radio access technology (RAT) such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). Additionally, CDMA2000 is described in documents from an organization named "3rd Generation Partnership Project 2" (3GPP2).

The WWAN block 1550 may utilize one or more radio access technologies (RATs) described above. For example, the WWAN block 1550 may communicate using one or more of the following technologies: CDMA2000 1x, GSM, HDR, HRPD, eHRPD, W-CDMA, TD-SCDMA and LTE.

During communication with the remote device 1504, the wireless communication device 1502 may transmit or receive an NFC-type signal operating outside of the near-field region using the repurposed WWAN antenna 1510. The signal may be a carrier signal that has a carrier frequency greater than 13.56 megahertz (MHz).

For far-field frequencies 1526, the wireless communication device 1502 may transmit and receive off-tune from 13.56 MHz using the repurposed WWAN antenna 1510 with an associated far-field matching network 1512b. The repurposed WWAN antenna 1510 may be coupled to a far-field matching network 1512b that is configured to resonate at a far-field frequency 1526. In one implementation, the repurposed WWAN antenna 1510 may also be coupled to a diplexer. The diplexer may allow the wireless communication device 1502 to repurpose the WWAN antenna 1510 for the NFC block 1520 and the WWAN block 1550.

Because the repurposed WWAN antenna 1510 may be used for NFC in the far-field region, the communication range may be extended. This is because NFC-type operations in this case are not limited by reactive region coupling and associated near-field propagation losses. In other words, the wireless communication device 1502 may use the repurposed WWAN antenna 1510 to implement radio frequency (RF) communication to perform NFC-type operations in the far-field.

The described systems and methods can be used to enable communication between readers (e.g., NFC-equipped handsets) and tags that operate at a near-field frequency 524, a far-field frequency 1526 or both. As used herein, the near-field frequency 524 is approximately 13.56 MHz. It should be noted that in one configuration, these far-field frequencies 1526 may be harmonics of the 13.56 MHz NFC frequency. In another configuration, these far-field frequencies 1526 need not be harmonics of the 13.56 MHz NFC frequency.

In one implementation, the wireless communication device 1502 may include an NFC block 1520, an NFC loop antenna 1540, a near-field matching network 1512a, a WWAN antenna 1510 and a far-field matching network 1512b. The NFC loop antenna 1540 may be a loop or coil antenna. The near-field matching network 1512a may have a certain impedance (i.e., near-field impedance) that is configured to produce resonance in the NFC loop antenna 1540 at the near-field frequency 524 (e.g., 13.56 MHz).

In one configuration, the WWAN antenna 1510 may be configured for cellular communication. In another configuration, the repurposed WWAN antenna 1510 may be further implemented by adapting the existing NFC loop antenna 1540 by using segments of the wireless communication device 1502 to change the electrical length of the NFC loop antenna 1540, as described below. The far-field matching network 1512b may have a far-field impedance that is configured to produce resonance in the WWAN antenna 1510 at the far-field frequency 1526.

In one configuration, the NFC block 1520 may be an NFC controller. The NFC block 1520 may include a near-field operation module 1522 and a far-field operation module 1506. The wireless communication device 1502 may switch between the NFC loop antenna 1540 for near-field operation and the repurposed WWAN antenna 1510 for far-field operation. The wireless communication device 1502 may have a mode of operation for near-field communication (i.e., near-field mode 1542) and another mode of operation for far-field communication (i.e., far-field mode 1544).

In near-field mode 1542, the wireless communication device 1502 may perform NFC-type operations using the NFC loop antenna 1540. For example, the wireless communication device 1502 may transmit or receive a carrier signal at the near-field frequency 524 of 13.56 MHz. While in near-field mode 1542, the NFC loop antenna 1540 of the wireless communication device 1502 may be inductively coupled with the antenna 1516 of the remote device 1504.

In far-field mode 1544, the wireless communication device 1502 may switch to performing NFC-type operations using the repurposed WWAN antenna 1510. While in far-field mode 1544, the wireless communication device 1502 may generate a carrier frequency at a far-field frequency 1526 that is greater than 13.56 MHz. The wireless communication device 1502 may use the repurposed WWAN antenna 1510 to send and receive NFC protocol signals in the far-field region.

The far-field matching network 1512b may be configured with a far-field impedance that produces resonance in the repurposed WWAN antenna 1510 at the far-field frequency 1526. In this implementation, the far-field impedance may be optimized for the far-field frequency 1526. The far-field impedance may produce a resonant peak that coincides with the far-field frequency 1526.

In a first approach, the wireless communication device 1502 may perform NFC-type operations in the far-field by creating a hybrid antenna from existing structures of the wireless communication device 1502. In this approach, the wireless communication device 1502 may operate the radio communications of the existing NFC solution in the far-field region.

In order to adapt the existing NFC loop antenna 1540, segments of various printed circuit board (PCB) traces, ground layers and metal structures of the wireless communication device 1502 may be coupled to the NFC loop antenna 1540 to change the electrical length of the existing NFC loop antenna 1540. Alternatively, the wireless communication device 1502 may switch to these structures entirely to perform far-field communication. A monopole or a dipole antenna may be created for this purpose. Additionally, if a low frequency cellular band antenna (i.e., WWAN antenna 1510) is incorporated into the wireless communication device 1502, repurposing this hybrid antenna or portions thereof can also be utilized.

In this approach, the carrier frequency for near-field mode 1542 may remain at 13.56 MHz. The traditional NFC operation in the near-field can be maintained by switching back the elements used to create the hybrid antenna.

In a second approach, the wireless communication device 1502 may repurpose the WWAN antenna 1510 that already exists on the wireless communication device 1502. A WWAN antenna 1510 may also be referred to as a cellular antenna. The WWAN antenna 1510 may operate at various cellular bands in the frequency range from 400 MHz to 2.7 GHz. The wireless communication device 1502 may take advantage of this fact and increase the operating frequency for the NFC-type operations to fall in this range in order to use this antenna. This operating frequency may be the far-field frequency 1526. An example of this approach is described in connection with FIG. 16.

With the described systems and methods, NFC-type operations in the far-field region could be performed at various frequencies supported by the repurposed WWAN antenna 1510. In the case of WWAN antennas 1510, a single WWAN antenna 1510 could typically support multiple bands in the frequency range from 400 MHz to 2.7 GHz. This provides an opportunity for NFC-type operations at ISM bands in this range. These ISM bands include 433.05 MHz to 434.79 MHz; 902 MHz to 928 MHz; 2.4 GHz to 2.483 GHz; and other frequencies at which the repurposed WWAN antenna 1510 has sufficient gain.

In a third approach, the repurposed WWAN antenna 1510 may be combined with the NFC loop antenna 1540 to create a composite antenna. The third approach allows NFC-type operations at lower frequencies than traditional frequencies supported by WWAN antennas 1510, which may not have sufficient gain below 800 MHz. Lower operating frequencies can be supported by combining the WWAN antenna 1510 with the NFC loop antenna 1540 to create a composite antenna. This third approach is described in more detail in connection with FIG. 16.

The described systems and methods will result in NFC-type operations outside the near-field region. Therefore, the range of NFC may be extended. The described systems and methods may maintain the existing NFC circuitry (e.g., near-field matching network 1512a and NFC loop antenna 1540) for near-field operations. However, further optimization may be achieved by using the repurposed WWAN antenna 1510 and far-field matching network 1512b for far-field operations. Additionally, because the communication between the wireless communication device 1502 and the remote device 1504 occurs outside the near-field region, the communication is less susceptible to interference due to magnetic coupling.

Figure 16:
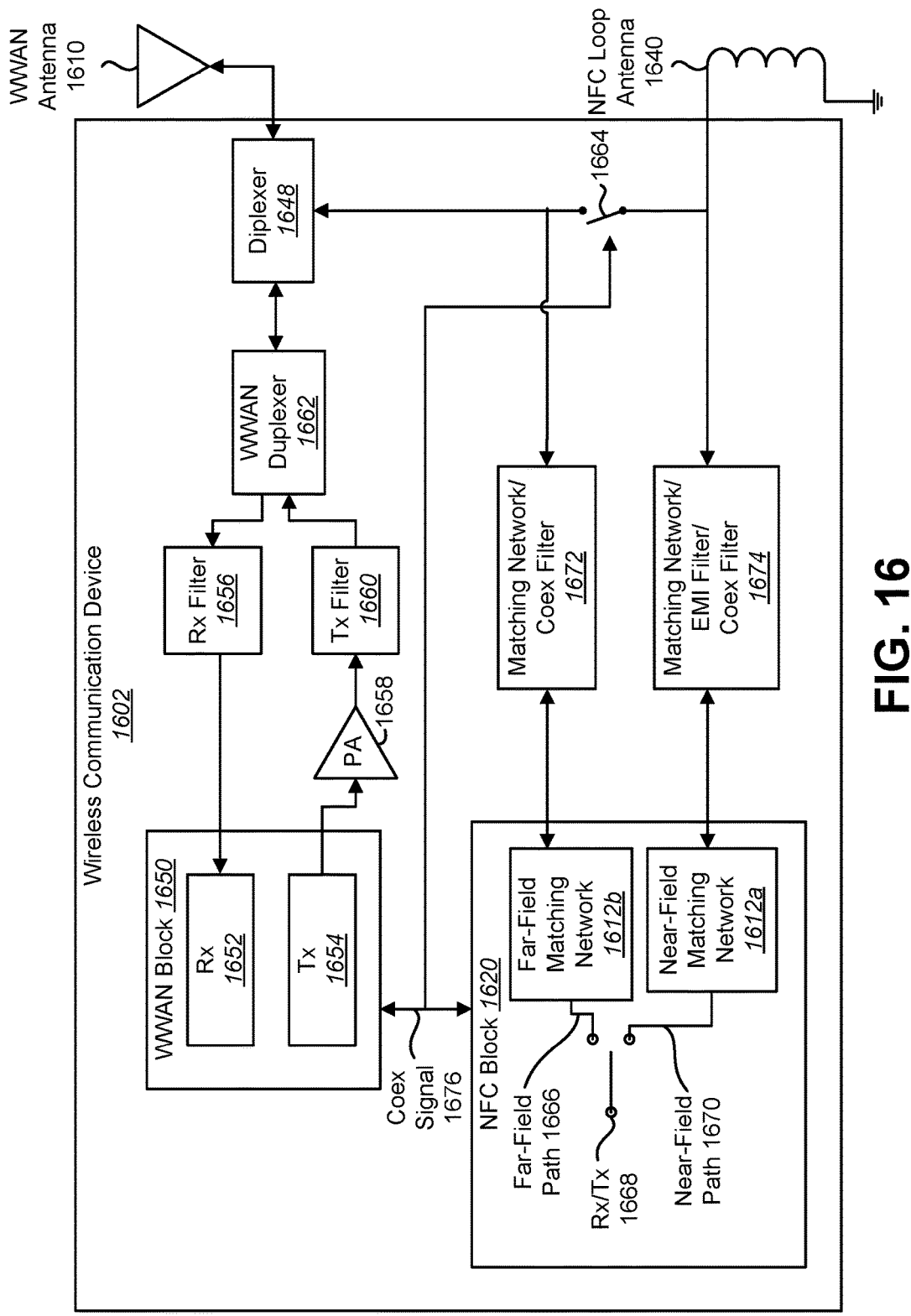
FIG. 16 is a block diagram illustrating one example of a wireless communication device configured for NFC-type operations in the far-field region using a repurposed WWAN antenna.

FIG. 16 is a block diagram illustrating one example of a wireless communication device 1602 configured for NFC-type operations in the far-field region using a repurposed WWAN antenna 1610. The wireless communication device 1602 may include an NFC block 1620 and a WWAN block 1650.

The NFC block 1620 may include a transmitter (Tx) and a receiver (Rx) 1668 for sending and receiving NFC signals. The transmitter and receiver 1668 may be switched between a near-field path 1670 and a far-field path 1666. When the NFC block 1620 is in near-field mode 1542, the near-field path 1670 may be selected. When the NFC block 1620 is in far-field mode 1544, the far-field path 1666 may be selected.

The near-field path 1670 may include an internal near-field matching network 1612a and an external matching network/EMI filter/coexistence (coex) filter 1674 coupled to an NFC loop antenna 1640. The internal near-field matching network 1612a may be configured with an impedance to produce resonance at the near-field frequency 1524.

The far-field path 1666 may include an internal far-field matching network 1612b and an external matching network/coex filter 1672. The internal far-field matching network 1612b may be configured with an impedance to produce resonance at the far-field frequency 1526.

The wireless communication device 1602 may include a diplexer 1648. The diplexer 1648 may be coupled to the WWAN antenna 1610, a WWAN duplexer 1662 and the matching network/coex filter 1672 of the far-field path 1666. The diplexer 1648 may allow the NFC block 1620 to repurpose the WWAN antenna 1610 of the WWAN block 1650 to avoid the impact to WWAN/cellular operation and vice versa.

The WWAN block 1650 may perform operations related to cellular communication. The WWAN block 1650 may include a receiver (Rx) 1652 and a transmitter (Tx) 1654. The transmitter 1654 of the WWAN block 1650 may send a signal via a power amplifier (PA) 1658 and a Tx filter 1660. The receiver 1652 may receive a signal filtered by an Rx filter 1656.

In some cases, there may be insufficient frequency separation between far-field NFC-type operations and WWAN so that coex filtering becomes impractical. Furthermore, NFC-type operations in the far-field may even operate in the same band as WWAN. Since NFC-type operations in the far-field are at a much lower data rate in comparison to WWAN, to avoid mutual interference, a simple packet arbitration procedure may be implemented through a coex pin. The NFC block 1620 and the WWAN block 1650 may send and receive a coex signal 1676 to each other to perform the packet arbitration procedure. Packets may be scheduled for NFC-type operations in the far-field and WWAN communication. If the NFC-type operations in the far-field solution or portions thereof are integrated within a single mobile station modem (MSM), then this coex pin may become an internal signal to the MSM, reducing the number of pins for both integrated circuits (ICs).

When the NFC block 1620 is in near-field mode 1542, the wireless communication device 1602 may perform NFC-type operations using the NFC loop antenna 1640. In this case, the NFC block 1620 may transmit and receive a carrier signal at the near-field frequency 1524 via the NFC path.

When the NFC block 1620 is in far-field mode 1544, the wireless communication device 1602 may perform NFC-type operations outside the near-field using the repurposed WWAN antenna 1610. In this case, the NFC block 1620 may transmit and receive a carrier signal at the far-field frequency 1526 via the far-field path 1666.

In another configuration, the repurposed WWAN antenna 1610 may be combined with the NFC loop antenna 1640 to create a composite antenna. This approach allows NFC-type operations at lower frequencies than traditional frequencies supported by WWAN antennas 1610, which may not have sufficient gain below 800 MHz. Lower operating frequencies can be supported by combining a WWAN antenna 1610 with the NFC loop antenna 1640 to create a composite antenna. This may be accomplished using an antenna switch 1664. When combined, the electrical length of the WWAN antenna 1610 increases, which in turn provides sufficient gain at lower frequencies, such as 433.05 MHz to 434.79 MHz in the ISM band.

In FIG. 16, the coex signal 1676 may control an antenna switch 1664 to enable the WWAN/NFC composite antenna. By closing the antenna switch 1664, the composite antenna may be enabled. By opening the antenna switch 1664, the composite antenna may be disabled. With the combination of the antenna switch 1664, the aforementioned modes can be supported.

Figure 17:
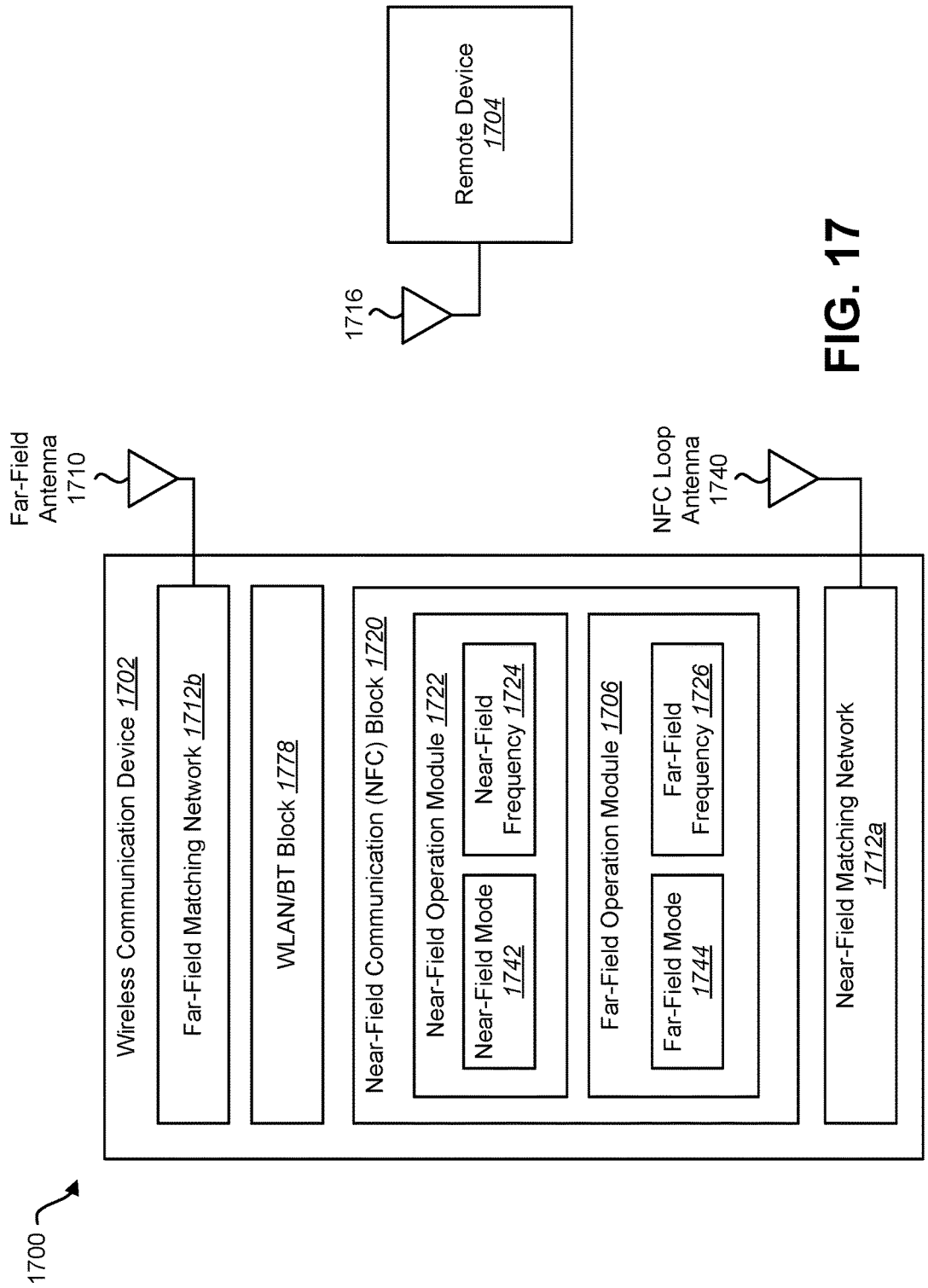
FIG. 17 is a block diagram illustrating one configuration of a wireless communication system for NFC-type operations in the far-field region using a repurposed far-field antenna.

FIG. 17 is a block diagram illustrating one configuration of a wireless communication system 1700 for NFC-type operations in the far-field region using a repurposed far-field antenna 1710. The wireless communication system 1700 may include a wireless communication device 1702 that is in communication with a remote device 1704. The wireless communication device 1702 may be implemented in accordance with the wireless communication device 102 described in connection with FIG. 1.

As described above, an NFC-configured wireless communication device 1702 may leverage structures and antennas that are physically (and electrically) long with respect to higher frequency wavelengths. These structures and antennas may be collectively referred to as a far-field antenna 1710. In one implementation, the far-field antenna 1710 may be an antenna used for wireless local area network (WLAN) (e.g., Wi-Fi) or Bluetooth (BT) communication.

A WLAN/BT block 1778 may perform WLAN and/or BT operations. As used herein, the WLAN/BT block 1778 may include functionality for only WLAN, only BT or both WLAN and BT.

WLAN technologies may operate in accordance with certain industry standards, such as Institute of Electrical and Electronics Engineers (IEEE) 802.11 (e.g., Wireless Fidelity or "Wi-Fi") standards. The IEEE 802.11 standards include 802.11b, 802.11g, 802.11n, 802.11ac and/or 802.11ah.

During communication with the remote device 1704, the wireless communication device 1702 may perform NFC-type operations in the far-field region by repurposing the far-field antenna 1710. The wireless communication device 1702 may transmit or receive an NFC-type signal. This signal may be a carrier signal that has a carrier frequency greater than 13.56 megahertz (MHz).

For far-field frequencies 1726, the wireless communication device 1702 may transmit and receive off-tune from 13.56 MHz using the repurposed far-field antenna 1710 with an associated far-field matching network 1712b. The far-field antenna 1710 may be coupled to a far-field matching network 1712b that is configured to resonate at a far-field frequency 1726. In one implementation, the far-field antenna 1710 may also be coupled to a diplexer. The diplexer may allow the wireless communication device 1702 to repurpose the far-field antenna 1710 for performing NFC-type operations in the far-field region. For example, the diplexer may switch the far-field antenna 1710 between the NFC block 1720 and the block and the WLAN/BT block 1778.

The described systems and methods can be used to enable communication between readers (e.g., NFC-equipped handsets) and tags that operate at a near-field frequency 1724, a far-field frequency 1726 or both. A far-field frequency 1726 may be within frequency bands. It should be noted that in one configuration, these far-field frequencies 1726 may be harmonics of the 13.56 MHz NFC frequency. In another configuration, these far-field frequencies 1726 need not be harmonics of the 13.56 MHz NFC frequency.

In another example, the far-field frequency 1726 may cover 755-787 MHz, 863-868 MHz and 916.5-927.5 MHz bands. Channelization may also be composed of two or more noncontiguous frequency bands (e.g., 866-869 MHz and 920-925 MHz bands). It should be noted that the frequencies and bands described herein are provided as examples, and the far-field frequency 1726 may not be limited solely to these frequencies/bands.

In one implementation, the wireless communication device 1702 may include an NFC block 1720, an NFC loop antenna 1740, a near-field matching network 1712a, a far-field antenna 1710 and a far-field matching network 1712b. The NFC loop antenna 1740 may be a loop or coil antenna. The near-field matching network 1712a may have a certain impedance (i.e., near field impedance) that is configured to produce resonance in the NFC loop antenna 1740 at the near-field frequency 1724 (e.g., 13.56 MHz).

In one configuration, the far-field antenna 1710 may be implemented as a WLAN/BT antenna. In another configuration, the far-field antenna 1710 may be implemented by adapting the existing NFC loop antenna 1740 by using segments of the wireless communication device 1702 to change the electrical length of the NFC loop antenna 1740. The far-field matching network 1712*b* may have an impedance that is configured to produce resonance in the far-field antenna 1710 at the far-field frequency 1726.

In one configuration, the NFC block 1720 may be an NFC controller. The NFC block 1720 may include a near-field operation module 1722 and a far-field operation module 1706. The wireless communication device 1702 may switch between the NFC loop antenna 1740 for near-field operation and the far-field antenna 1710 for far-field operation. The wireless communication device 1702 may have a mode of operation for near field communication (i.e., near-field mode 1742) and another mode of operation for far-field communication (i.e., far-field mode 1744).

In near-field mode 1742, the wireless communication device 1702 may perform NFC-type operations using the NFC loop antenna 1740. For example, the wireless communication device 1702 may transmit or receive a carrier signal at the near-field frequency 1724 of 13.56 MHz. While in near-field mode 1742, the NFC loop antenna 1740 of the wireless communication device 1702 may be inductively coupled with the antenna 1716 of the remote device 1704.

In far-field mode 1744, the wireless communication device 1702 may switch to performing NFC-type operations using the far-field antenna 1710. While in far-field mode 1744, the wireless communication device 1702 may generate a carrier frequency at a far-field frequency 1726 that is greater than 13.56 MHz. The wireless communication device 1702 may use the far-field antenna 1710 to send and receive NFC-type signals in the far-field region.

The far-field matching network 1712*b* may be configured with a far-field impedance that produces resonance in the far-field antenna 1710 at the far-field frequency 1726. In this implementation, the far-field impedance may be optimized for the far-field frequency 1726. The far-field impedance may produce a resonant peak that coincides with the far-field frequency 1726.

The wireless communication device 1702 may operate in multiple modes for different far-field frequencies 1726. In one configuration, the far-field operation module 1706 may be configured to perform wireless communication using multiple far-field frequencies 1726. For example, the far-field operation module 1706 may perform wireless communication with one or more remote devices 1704 using 27.12 MHz, 40.68 MHz, 433.92 MHz, 915 MHz or 2.45 GHz carrier frequencies.

In a first approach, the wireless communication device 1702 may perform NFC-type operations in the far-field by creating a hybrid antenna from existing structures of the wireless communication device 1702. To adapt the existing NFC loop antenna 1740, segments of various printed circuit board (PCB) traces, ground layers and metal structures of the wireless communication device 1702 may be coupled to the NFC loop antenna 1740 to change the electrical length of the existing NFC loop antenna 1740. Alternatively, the wireless communication device 1702 may switch to these structures entirely to perform far-field communication. A monopole or a dipole antenna may be created for this purpose. Additionally, if a WLAN/BT far-field antenna 1710 is incorporated into the wireless communication device 1702, repurposing this hybrid antenna or portions thereof can also be utilized.

In a second approach, the wireless communication device 1702 may share the WLAN/BT far-field antenna 1710 that already exists on the wireless communication device 1702. The WLAN/BT far-field antennas 1710 operate in ISM bands 2400-2483.5 MHz and 5725-5875 MHz. As a result, the NFC operating frequency can also be increased to this range or any other range of frequencies so long as there is sufficient WLAN/BT antenna gain. This operating frequency may be the far-field frequency 1726. An example of this approach is described in connection with FIG. 18.

In a third approach, the far-field antenna 1710 may be combined with the NFC loop antenna 1740 to create a composite antenna. The third approach NFC-type operations at lower frequencies than traditional frequencies supported by WLAN/BT antennas. Lower operating frequencies can be supported by combining a far-field antenna 1710 with the NFC loop antenna 1740 to create a composite antenna. This third approach is described in more detail in connection with FIG. 18.

Based on the systems and methods described herein, NFC-type operations at various far-field frequencies 1726 may be supported by one or more far-field antennas 1710. The WLAN service could either be provided by a single antenna or a multiplicity of far-field antennas 1710 in a phone, tablet, etc. Nonetheless, the single or multiple far-field antennas 1710 cover 802.11 bands over the designated spectrum that could include 900 MHz, 2.4 GHz, 3.6 GHz, 5 GHz, and 5.9 GHz bands. This provides an opportunity for NFC-type operations to operate at 802.11 bands, ISM bands, or any other frequency band supported. For the latter, the WLAN antenna 1710 may need to be reconfigured or appropriate matching networks provided. For example, this may allow an 802.11ah antenna/radio operating from 902-928 MHz to be reconfigured to operate at a lower ISM band such as 433.05 MHz to 434.79 MHz. It should be noted that the frequencies and bands described herein are just examples, and the far-field frequency 1726 may not be limited to these frequencies/bands.

In a fourth approach, in addition to repurposing the far-field antenna 1710, NFC-type operations can share a full WLAN 802.11ah radio (Rx/Tx) or portions thereof. In other words, NFC-type operations may be implemented by the WLAN/BT block 1778. This approach may reduce the front end complexity. This may also reduce silicon area because a separate radio (Rx/Tx) for NFC-type operations is no longer needed. This may reduce cost. Furthermore, the far-field antenna 1710 may be optimized for both WLAN 802.11ah and NFC-type technologies.

NFC-type operations may be performed at the same frequency as WLAN 802.11ah or may operate at any other frequency supported by the far-field antenna 1710. Because WLAN 802.11ah operates in the 902-928 MHz ISM band, the far-field antenna 1710 is optimal for this band, which NFC-type operations could share. Additionally, the 802.11ah far-field antenna 1710 could have sufficient gain in the lower ISM band, 433.05-434.79 MHz.

In one configuration, the base band signals from WLAN and NFC-type operations may be multiplexed to the radio via a select signal so that either technology will have access to the radio and antenna. An example of this configuration is described in connection with FIG. 19.

In another configuration, WLAN and NFC-type operations could have full concurrent receive and transmit operations. An example of this architecture is described in connection with FIG. 20.

In yet another configuration, a single MAC, modem, and radio that are typically used for far-field communication (e.g., WWAN or WLAN) may be reconfigured for NFC-type operations by means of a software configuration. An example of this configuration is described in connection with FIG. 21. This configuration provides a simple architecture.

The described systems and methods will result in NFC-type communications outside the near-field region. Therefore, the range of NFC may be extended. The described systems and methods may maintain the existing NFC circuitry (e.g., near-field matching network 1712a and NFC loop antenna 1740) for near-field operations. However, further optimization may be achieved by repurposing the far-field antenna 1710 and far-field matching network 1712b for NFC-type operations in the far-field region. Additionally, because the communication between the wireless communication device 1702 and the remote device 1704 occurs outside the near-field region, the communication is less susceptible to interference due to magnetic coupling.

Figure 18:
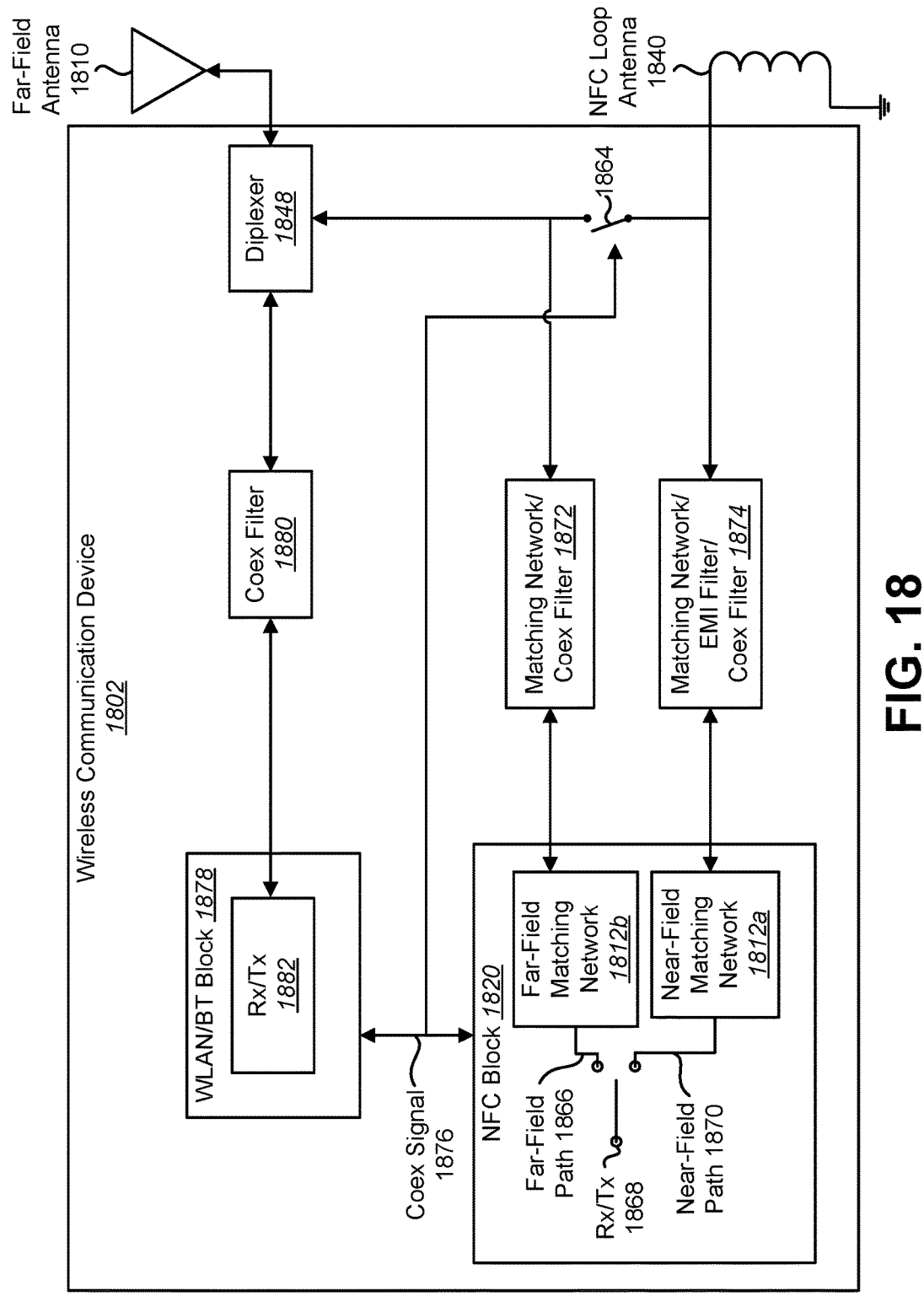
FIG. 18 is a block diagram illustrating one example of a wireless communication device configured for NFC-type operations in the far-field using a repurposed far-field antenna.

FIG. 18 is a block diagram illustrating one example of a wireless communication device 1802 configured for NFC-type operations in the far-field using a repurposed far-field antenna 1810. The wireless communication device 1802 may include an NFC block 1820 and a WLAN/BT block 1878.

The NFC block 1820 may include a transmitter (Tx) and a receiver (Rx) 1868 for sending and receiving NFC-type signals. The transmitter and receiver 1868 may be switched between a near-field path 1870 and a far-field path 1866. When the NFC block 1820 is in near-field mode 1742, the near-field path 1870 may be selected. When the NFC block 1820 is in far-field mode 1744, the far-field path 1866 may be selected.

The near-field path 1870 may include an internal near-field matching network 1812a and an external matching network/EMI filter/coexistence (coex) filter 1874 coupled to an NFC loop antenna 1840. The internal near-field matching network 1812a may be configured with an impedance to produce resonance at the near-field frequency 1724.

The far-field path 1866 may include an internal far-field matching network 1812b and an external matching network/coex filter 1872. The internal far-field matching network 1812b may be configured with an impedance to produce resonance at the far-field frequency 1726.

The wireless communication device 1802 may include a diplexer 1848. The diplexer 1848 may be coupled to the far-field antenna 1810, a coex filter 1880 of the WLAN/BT block 1878 and the matching network/coex filter 1872 of the far-field path 1866. The diplexer 1848 may allow the NFC block 1820 to repurpose the far-field antenna 1810 of the WLAN/BT block 1878 to avoid the impact to WLAN/BT operation and vice versa.

The WLAN/BT block 1878 may perform WLAN (e.g., Wi-Fi) operations, Bluetooth operations or both. The WLAN/BT block 1878 may include a receiver (Rx) and a transmitter (Tx) 1882.

The internal near-field matching network 1812a may be configured with an impedance (e.g., near-field impedance) that produces resonance in the NFC loop antenna 1840 at the near-field frequency 1724 (e.g., 13.56 MHz). The internal far-field matching network 1812b may be configured with an impedance that produces resonance in the repurposed far-field antenna 1810 at the far-field frequency 1726.

In some cases, there may be insufficient frequency separation far-field NFC-type operations and WWAN so that coex filtering becomes impractical. Furthermore, NFC-type operations in the far-field may even operate in the same band as WLAN/BT. Since NFC-type operations are at a much lower data rate in comparison to WLAN/BT, to avoid mutual interference, a simple packet arbitration procedure may be implemented through a coex pin. The NFC block 1820 and the WLAN/BT block 1878 may send and receive a coex signal 1876 to each other to perform the packet arbitration procedure. Packets may be scheduled for NFC-type operations and WLAN/BT communication. If the NFC-type operations solution or portions thereof are integrated within a WLAN/BT solution, then this coex pin may become an internal signal to the two technologies, reducing the number of pins for both integrated circuits (ICs).

When the NFC block 1820 is in near-field mode 1742, the wireless communication device 1802 may perform NFC-type operations using the NFC loop antenna 1840. In this case, the NFC block 1820 may transmit and receive a carrier signal at the near-field frequency 1724 via the NFC path.

When the NFC block 1820 is in far-field mode 1744, the wireless communication device 1802 may perform NFC-type operations outside the near-field using the repurposed far-field antenna 1810. In this case, the NFC block 1820 may transmit and receive a carrier signal at the far-field frequency 1726 via the far-field path 1866.

In another configuration, the repurposed far-field antenna 1810 may be combined with the NFC loop antenna 1840 to create a composite antenna. This approach allows NFC-type operations at lower frequencies than traditional frequencies supported by WLAN/BT far-field antennas 1810. Lower operating frequencies can be supported by combining the WLAN/BT far-field antenna 1810 with the NFC loop antenna 1840 to create a composite antenna. When combined, the electrical length of the WLAN/BT far-field antenna 1810 increases, which in turn provides sufficient gain at lower frequencies.

In FIG. 18, the coex signal 1876 may control an antenna switch 1864 to enable the WLAN/BT/NFC composite antenna. By closing the antenna switch 1864, the composite antenna may be enabled. By opening the antenna switch 1864, the composite antenna may be disabled. With the combination of the antenna switch 1864, the aforementioned modes can be supported.

Figure 19:
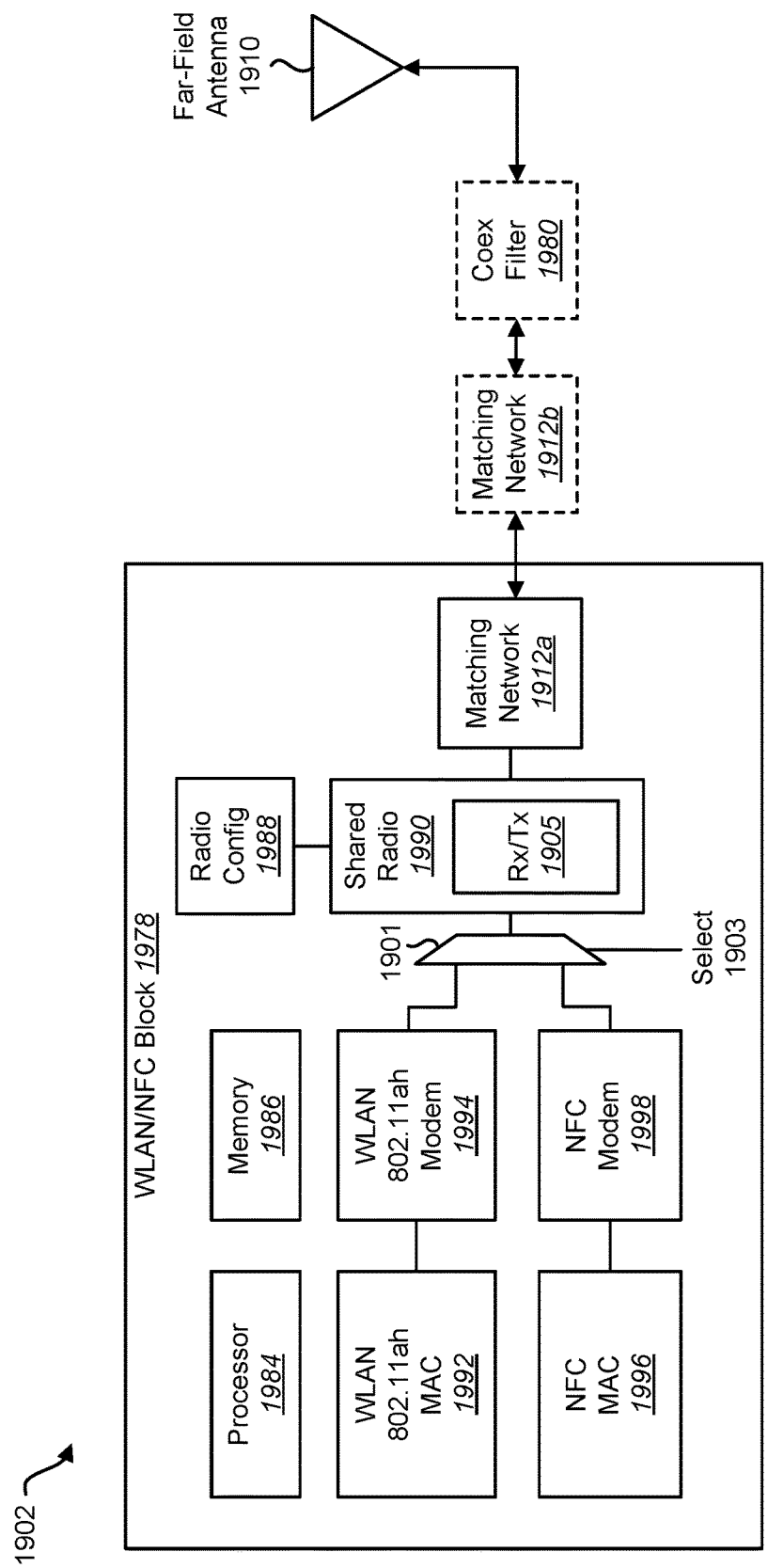
FIG. 19 is a block diagram illustrating another example of a wireless communication device configured for NFC-type operations in the far-field region using a repurposed far-field antenna.

FIG. 19 is a block diagram illustrating another example of a wireless communication device 1902 configured for NFC-type operations in the far-field region using a repurposed far-field antenna 1910. In this example, the wireless communication device 1902 may perform NFC-type operations in the far-field region and WLAN operations using a common shared radio 1990 and far-field antenna 1910.

A WLAN/NFC block 1978 may include a processor 1984 and memory 1986. A WLAN 802.11ah MAC 1992 and a WLAN 802.11ah modem 1994 may be coupled to a multiplexer 1901. An NFC MAC 1996 and a NFC modem 1998 may also be coupled to the multiplexer 1901.

The shared radio 1990 may have a transmitter (Tx) and a receiver (Rx) 1905. The shared radio 1990 may be configured for 802.11ah or NFC-type operation by a radio configuration (config) block 1988. The shared radio 1990 may be coupled to an internal matching network 1912a. The internal matching network 1912a may be coupled to an (optional) external matching network 1912b, which is in turn coupled to a (optional) coexistence (coex) filter 1980 and far-field antenna 1910.

In this configuration, the base band signals from WLAN and NFC-type operations may be multiplexed to the shared radio 1990 via a select signal 1903 so that either technology (i.e., WLAN and NFC-type operations) will have access to the shared radio 1990 and far-field antenna 1910. Therefore, the WLAN/NFC block 1978 may implement a time share (e.g., time division duplexing) of the common shared radio 1990 and far-field antenna 1910.

The WLAN/NFC block 1978 may perform NFC-type operations outside the near-field region when in a far-field mode 1744. An NFC block 1720 (not shown) may perform NFC-type operations inside a near-field region using an NFC loop antenna 1740 (not shown) when in near-field mode 1742, as described above in connection with FIG. 17.

Figure 20:
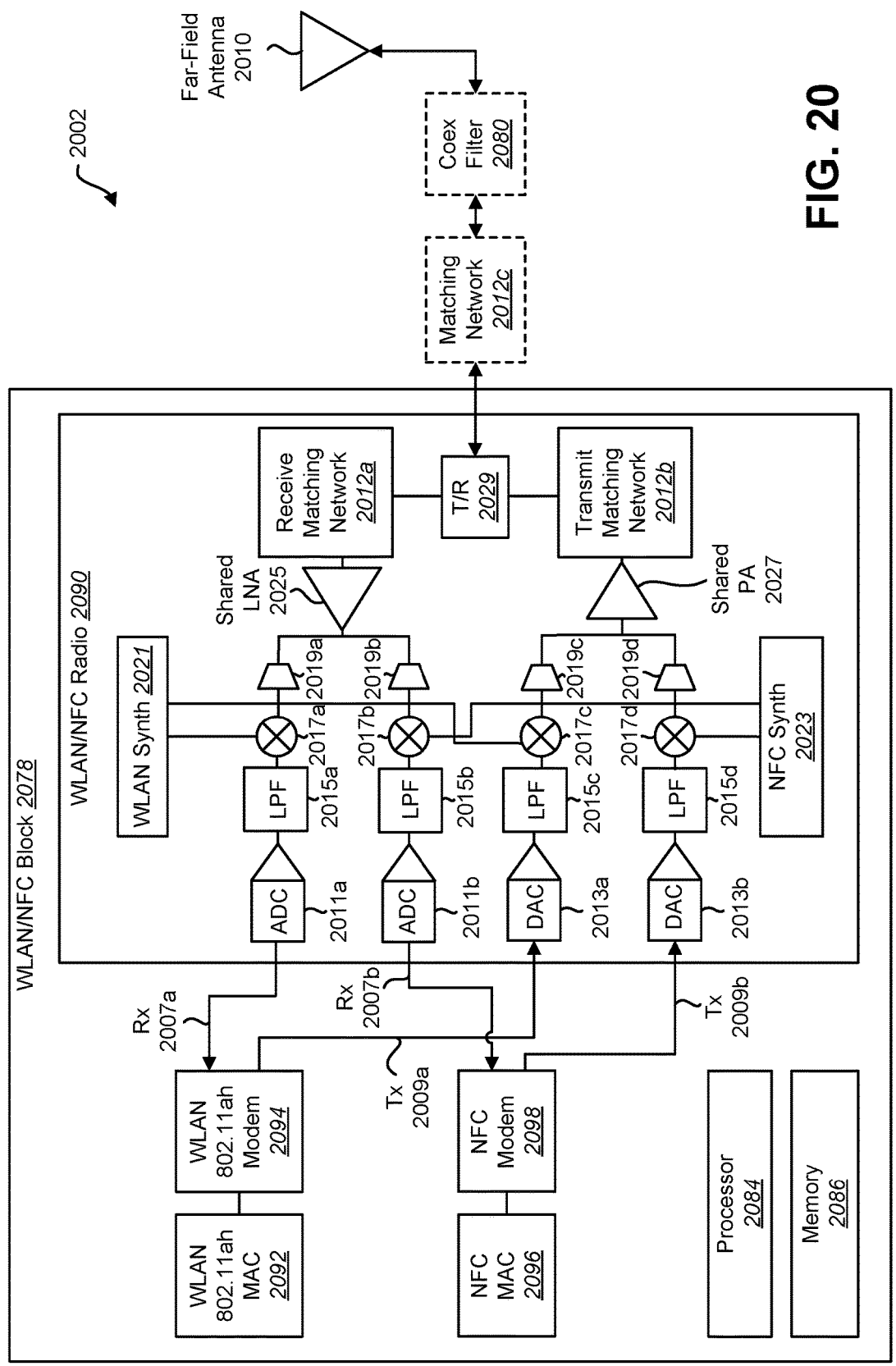
FIG. 20 is a block diagram illustrating yet another example of a wireless communication device configured for NFC-type operations in the far-field region using a repurposed far-field antenna.

FIG. 20 is a block diagram illustrating yet another example of a wireless communication device 2002 configured for NFC-type operations in the far-field region using a repurposed far-field antenna 2010. In this example, the wireless communication device 2002 may perform full concurrent NFC-type operations and WLAN operations.

A WLAN/NFC block 2078 may include a processor 2084 and memory 2086. A WLAN path may include a WLAN 802.11ah MAC 2092 and a WLAN 802.11ah modem 2094. An NFC-type operations path may include an NFC MAC 2096 and an NFC modem 2098.

A WLAN/NFC radio 2090 may include separate transmit chains and receiver chains for the WLAN path and the NFC-type operations path. The receiver chains may have a shared low noise amplifier (LNA) 2025 coupled to a receive matching network 2012a. The receiver chain of the WLAN path may include a bandpass filter 2019a, mixer 2017a, low pass filter (LPF) 2015a and analog-to-digital converter (ADC) 2011a that provides a received signal 2007a to the WLAN 802.11ah modem 2094. The receiver chain of the NFC-type operations path may include a bandpass filter 2019b, mixer 2017b, low pass filter (LPF) 2015b and an ADC 2011b that provides a received signal 2007b to the NFC modem 2098.

The transmit chains may have a shared power amplifier (PA) 2027 coupled to a transmit matching network 2012b. The transmit chain of the WLAN path may include a bandpass filter 2019c, mixer 2017c, low pass filter (LPF) 2015c and a digital-to-analog converter (DAC) 2013a that receives at transmit signal 2009a. The transmit chain of the NFC-type operations path may include a bandpass filter 2019d, mixer 2017d, low pass filter (LPF) 2015d and a DAC 2013b that receives at transmit signal 2009b.

A WLAN synthesizer 2021 may be coupled to the mixer 2017a of the WLAN receiver chain and the mixer 2017c of the WLAN transmit chain. An NFC synthesizer 2023 may be coupled to the mixer 2017b of the NFC-type operations receiver chain and the mixer 2017d of the NFC-type operations transmit chain.

The receive matching network 2012a and the transmit matching network 2012b may be coupled to a transmit/receive (T/R) block 2029. The T/R block 2029 may be coupled to an (optional) matching network 2012c and an (optional) coex filter 2080.

In this configuration, concurrent operation may occupy the same ISM band for NFC-type operations in the far-field and 802.11ah operation. Alternatively, two different ISM bands may be used for concurrent operation, such as the 433 MHz for NFC-type operations in the far-field and 902 MHz band for 802.11ah.

The WLAN/NFC block 2078 may perform NFC-type operations outside the near-field region when in a far-field mode 1744. An NFC block 1720 (not shown) may perform NFC-type operations inside a near-field region using an NFC loop antenna 1740 (not shown) when in near-field mode 1742, as described above in connection with FIG. 17.

Figure 21:
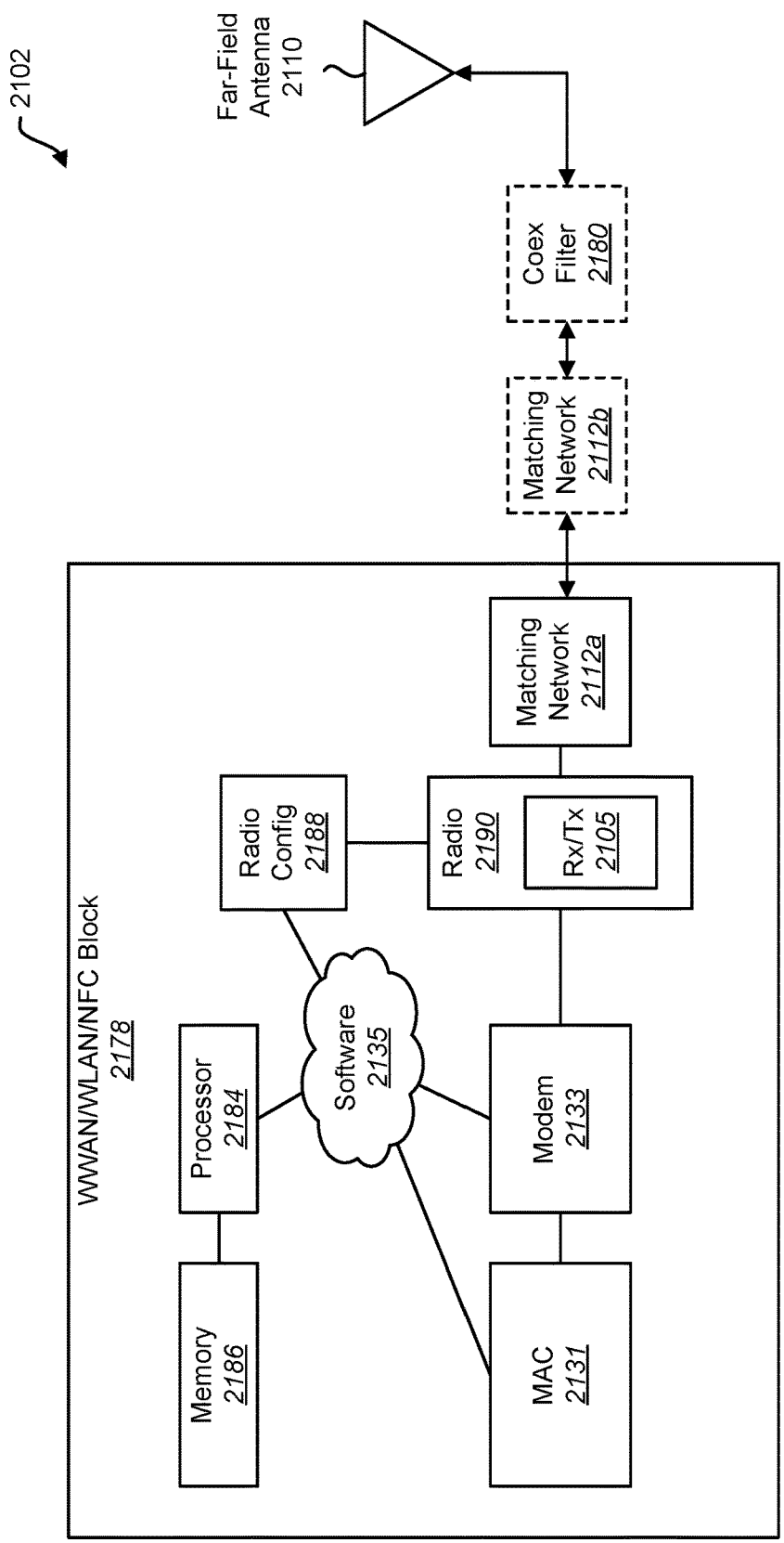
FIG. 21 is a block diagram illustrating another example of a wireless communication device configured for NFC-type operations in the far-field region using a repurposed far-field antenna.

FIG. 21 is a block diagram illustrating another example of a wireless communication device 2102 configured for NFC-type operations in the far-field region using a repurposed far-field antenna 2110. In this example, the wireless communication device 2102 may perform both NFC-type operations and far-field communication (e.g., WWAN or WLAN) using a single media access control (MAC) 2131, modem 2133 and radio 2190.

A WWAN/WLAN/NFC block 2178 may include a processor 2184 and memory 2186, as described above in connection with FIG. 19. However, in the configuration depicted in FIG. 21, the WWAN/WLAN/NFC block 2178 includes a single MAC 2131 and modem 2133 to perform NFC-type operations in the far-field and WWAN or WLAN operations. The radio 2190 that is typically used for WWAN or WLAN may be reconfigured for NFC-type operations in the far-field by means of a software configuration. It should be noted that the WWAN/WLAN/NFC block 2178 may be configured for WWAN communication or WLAN communication or a combination of WWAN and WLAN communication.

The radio 2190 may have a transmitter (Tx) and a receiver (Rx) 2105. The radio 2190 may be configured for 802.11ah or NFC-type operations in the far-field by a radio configuration (config) block 2188. The radio 2190 may be coupled to an internal matching network 2112a. The internal matching network 2112a may be coupled to an external matching network 2112b, which is in turn coupled to a coexistence (coex) filter 2180 and far-field antenna 2110.

The WWAN/WLAN/NFC block 2178 may perform NFC-type operations outside the near-field region when in a far-field mode 1744. An NFC block 1720 (not shown) may perform NFC-type operations inside a near-field region using an NFC loop antenna 1740 (not shown) when in near-field mode 1742, as described above in connection with FIG. 17. Alternatively, the wireless communication device 2102 may not include an NFC block 1720. Instead, the wireless communication device 2102 may only perform NFC-type operations in the far-field region using the WWAN/WLAN/NFC block 2178.

Figure 22:
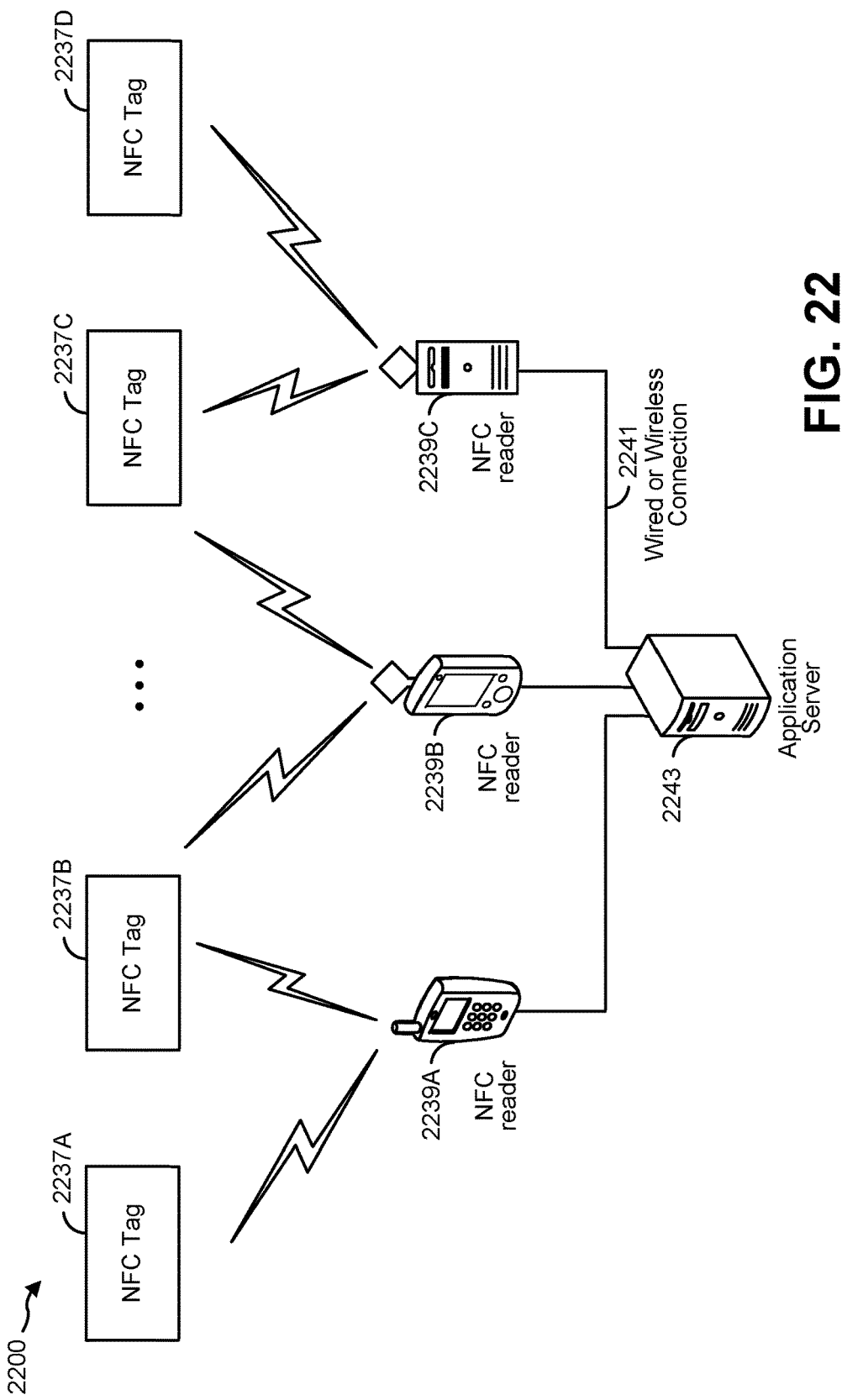
FIG. 22 is a block diagram illustrating an NFC system.

FIG. 22 is a block diagram illustrating an NFC system 2200. The NFC-type system 2200 includes a plurality of NFC tags 2237A-2237D, a plurality of NFC readers 2239A-2239C and an application server 2243.

The NFC tags 2237A-2237D may each be associated with a particular object for a variety of purposes including, but not limited to, tracking inventory, tracking status, location determination and assembly progress. The NFC tags 2237A-2237D may be active devices that include internal power sources or passive devices that derive power from the NFC readers 2239A-2239C.

Although FIG. 22 shows only four NFC tags and three NFC readers, the present disclosure is not limited thereto. In one configuration, the NFC tags 2237A-2237D may be implemented in accordance with the remote device 104 described in connection with FIG. 1. In one configuration, the readers 2239A-2239C may be implemented in accordance with the wireless communication device 102 described in connection with FIG. 1.

In addition to near-field operation, the NFC readers 2239A-2239C may operate with one or more NFC tags 2237A-2237D in the far-field region, as described above in connection with FIG. 1. Also an NFC reader 2239 may implement a mixed near-field and far-field reading/writing scenario. In other words, an NFC reader 2239 may communicate with a multiple NFC tags 2237A-2237D in the near-field or the far-field region.

Each NFC reader 2239A-2239C wirelessly communicates data with one or more NFC tags 2237A-2237D within its coverage area. For example, the NFC tags 2237A and 2237B may be within a coverage area of the NFC reader 2239A, the NFC tags 2237B and 2237C may be within a coverage area of the NFC reader 2239B, and the NFC tags 2237C and 2237D may be within a coverage area of the NFC reader 2239C. In one configuration, the RF communication mechanism between the NFC readers 2239A-2239C and the NFC tags 2237A-2237D is a backscatter technique. In this configuration, the NFC readers 2239A-2239C request data from the NFC tags 2237A-2237D via an RF signal, and the RF tags 2237A-2237D respond with the requested data by modulating and backscattering the RF signal provided by the NFC readers 2239A-2239C.

In a configuration for near-field communication, the RF communication mechanism is an inductance technique whereby the NFC readers 2239A-2239C magnetically couple to the NFC tags 2237A-2237D via an RF signal to access the data on the NFC tags 2237A-2237D. In a configuration for far-field communication, the RF communication mechanism is radio technique whereby the NFC readers 2239A-2239C transmit electromagnetic signals in the far-field region using a repurposed antenna to the NFC tags 2237A-2237D to access the data on the NFC tags 2237A-2237D. In any of these configurations, the NFC tags 2237A-2237D provide the requested data to the NFC readers 2239A-2239C on the same RF carrier frequency as the RF signal.

In this manner, the NFC readers 2239A-2239C collect data from each of the NFC tags 2237A-2237D within its coverage area. The collected data is then conveyed to the application server 2243 via a wired or wireless connection 2241 and/or via possible communication mechanism, for example, a peer-to-peer communication connection. In addition, and/or in the alternative, the application server 2243 may provide data to one or more of the NFC tags 2237A-2237D via the associated NFC readers 2239A-2239C. Such downloaded information is application dependent and may vary greatly. Upon receiving the downloaded data, the NFC tag can store the data in a non-volatile memory therein.

In another configuration, the NFC readers 2239A-2239C may optionally communicate data on a peer-to-peer basis such that each NFC reader does not need a separate wired or wireless connection 2241 to the application server 2243. For example, the NFC reader 2239A and the NFC reader 2239B may communicate on a peer-to-peer basis utilizing a back scatter technique, a WLAN technique, and/or any other wireless communication technique. In this instance, the NFC reader 2239B may not include a wired or wireless connection 2241 to the application server 2243. In configurations in which communications between the NFC reader 2239A-2239C and the application server 2243 are conveyed through the wired or wireless connection 2241, the wired or wireless connection 2241 may utilize any one of a plurality of wired standards (e.g., Ethernet and fire wire) and/or wireless communication standards (e.g., IEEE 802.11x and Bluetooth).

As one of ordinary skill in the art will appreciate, the NFC system of FIG. 22 may be expanded to include a multitude of NFC readers 2239A-2239C distributed throughout a desired location (for example, a building or office site) where the NFC tags may be associated with equipment, inventory and/or personnel. In addition, it should be noted that the application server 2243 may be coupled to another server and/or network connection to provide wide area network coverage.

Figure 23:
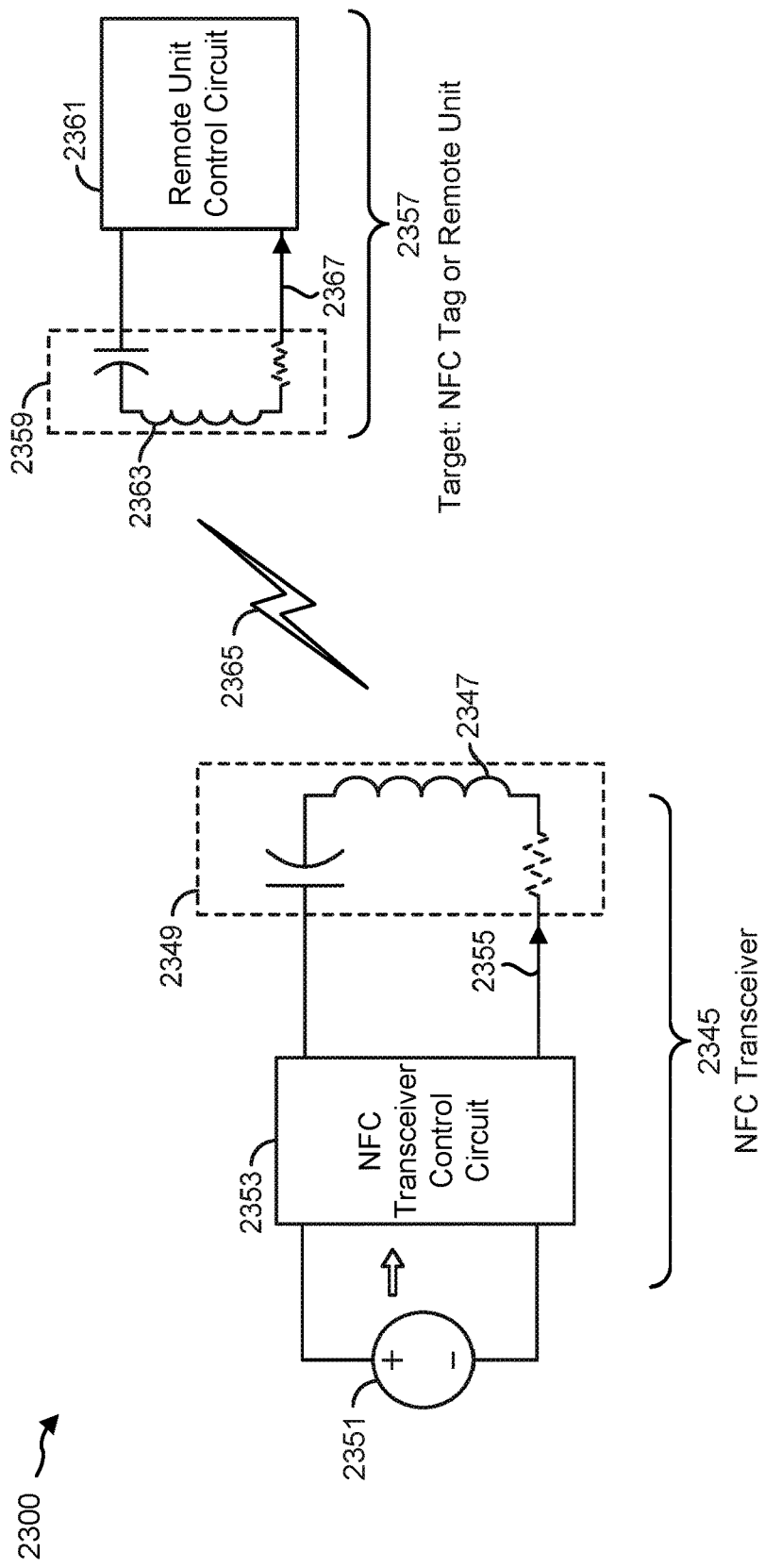
FIG. 23 is a block diagram illustrating an exemplary schematic of an NFC-type system including a transceiver and a remote unit.

FIG. 23 is a block diagram illustrating an exemplary schematic of an NFC-type system 2300 including a transceiver and a remote unit. The NFC system 2300 includes an NFC transceiver 2345 and a remote unit 2357 such as an NFC tag. The NFC transceiver 2345 may include a voltage power source 2351, an NFC transceiver control circuit 2353 and a transmitter circuit 2349. The NFC transceiver control circuit 2353 is powered by the voltage source 2351, and connected to one or more transceiver loops 2347.

The transceiver loops 2347 are hereinafter interchangeably used with coils or loop antennae. The coils and loop antenna may be made of conductive material, for example, an electromagnetic coil, through which an alternating current (AC) 2355 can flow. The transceiver loops 2347 may be circular, oval, and the like, although other sizes and shapes are possible.

For near-field communication, the AC current 2355 flowing through the transceiver loops 2347 can result in transmitting magnetic energy or magnetic flux 2365 at various frequencies (e.g., about 100 kHz to about 40 MHz). In a near-field case, the wavelength of the emitted frequencies may be much longer than the size of loops 2347 on the NFC transceiver 2345.

For far-field communication, the AC current 2355 flowing through the transceiver loops 2347 can result in transmitting an electromagnetic wave in the far-field region. The frequencies for far-field communication may be from 27.12 MHz to 2.45 GHz. In a far-field case, the wavelength of the emitted far-field frequencies may be a fraction (e.g., quarter, half) or multiple wavelengths of the size of loops 2347 on the NFC transceiver 2345.

The remote unit 2357 includes a receiver circuit 2359 and a remote unit control circuit 2361. If the remote unit 2357 is close enough to the NFC transceiver 2345, the magnetic flux 2365 from the transceiver 2345 can get AC coupled onto one or more remote unit loops 2363 of conductive material, which can be an unpowered device (i.e., without a battery or other means of applying continuous power) having the electromagnetic coil and remote unit control circuit 2361.

An oscillating AC current 2367 flowing in alternating directions in the remote unit control circuit 2361 can be rectified by a rectifying diode in the remote unit control circuit 2361, which can cause a voltage to be built up across a bypass capacitor in the remote unit control circuit 2361. Once the bypass capacitor has built up a sufficient voltage, the remote unit control circuit 2361 can become powered up and operational. By receiving coupled and modulated AC signal from the NFC transceiver 2345, the remote unit 2357 can receive and detect information (e.g., commands) from the NFC transceiver 2345.

Once operational, the remote unit control circuit 2361 may also send signals back to the NFC transceiver 2345 by changing the impedance seen by the remote unit loops 2363. This can be accomplished by shunting or opening the remote unit loops 2363 with, for example, a switch. If the remote unit 2357 is close enough to the NFC transceiver 2345, the modulated electromagnetic field generated by the remote unit loops 2363 in the remote unit 2357 can be coupled back onto the reader loops 2347 of the NFC transceiver 2345. The signals sent back to the NFC transceiver 2345 can be slow and on the order of 100 bits of data, and provide information back to the transceiver 2345 such as the serial number or model number of the device to which the remote unit 2357 is attached, credit card number, personal identification information, security codes and passwords, and the like.

Figure 24:
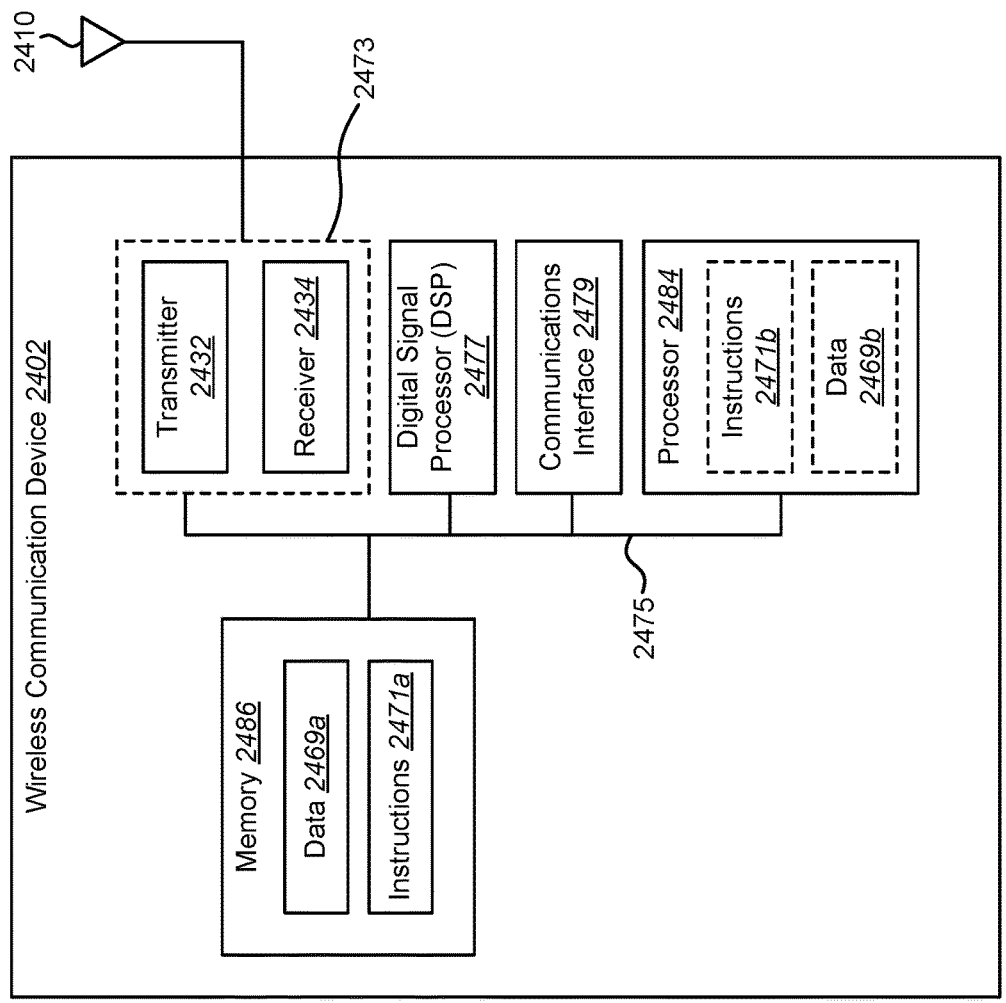
FIG. 24 illustrates certain components that may be included within a wireless communication device.

FIG. 24 illustrates certain components that may be included within a wireless communication device 2402. The wireless communication device 2402 may be an access terminal, a mobile station, a user equipment (UE), etc. For example, the wireless communication device 2402 may be the wireless communication device 102 of FIG. 1.

The wireless communication device 2402 includes a processor 2484. The processor 2484 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 2484 may be referred to as a central processing unit (CPU). Although just a single processor 2484 is shown in the wireless communication device 2402 of FIG. 24, in an alternative configuration, a combination of processors (e.g., an ARM and DSP) could be used.

The wireless communication device 2402 also includes memory 2486 in electronic communication with the processor (i.e., the processor can read information from and/or write information to the memory). The memory 2486 may be any electronic component capable of storing electronic information. The memory 2486 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 2469a and instructions 2471a may be stored in the memory 2486. The instructions may include one or more programs, routines, sub-routines, functions, procedures, code, etc. The instructions may include a single computer-readable statement or many computer-readable statements. The instructions 2471a may be executable by the processor 2484 to implement the methods disclosed herein. Executing the instructions 2471a may involve the use of the data 2469a that is stored in the memory 2486. When the processor 2484 executes the instructions 2471, various portions of the instructions 247 lb may be loaded onto the processor 2484, and various pieces of data 2469b may be loaded onto the processor 2484.

The wireless communication device 2402 may also include a transmitter 2432 and a receiver 2434 to allow transmission and reception of signals to and from the wireless communication device 2402 via an antenna 2410. The transmitter 2432 and receiver 2434 may be collectively referred to as a transceiver 2473. The wireless communication device 2402 may also include (not shown) multiplier transmitters, multiplier antennas, multiplier receivers and/or multiplier transceivers.

The wireless communication device 2402 may include a digital signal processor (DSP) 2477. The wireless communication device 2402 may also include a communications interface 2479. The communications interface 2479 may allow a user to interact with the wireless communication device 2402.

The various components of the wireless communication device 2402 may be coupled together by one or more buses, which may include a power bus, a control signal bus, a status signal bus, a data bus, etc. For the sake of clarity, the various buses are illustrated in FIG. 24 as a bus system 2475.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2-4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method, comprising:
   determining whether to perform near-field communication (NFC)-type operations in a near-field mode or a far-field mode;
   performing the NFC-type operations inside a near-field region using an NFC loop antenna when in the near-field mode;
   performing the NFC-type operations outside the near-field region using a repurposed wireless wide area network (WWAN) antenna when in the far-field mode; and
   performing, in response to determining the far-field mode, a packet arbitration procedure for WWAN communication and the NFC-type operations outside the near-field region.

2. The method of claim 1, wherein the NFC-type operations include wireless communication based on NFC protocols or radio frequency identification (RFID) protocols.

3. The method of claim 1, wherein performing the NFC-type operations outside the near-field region comprises transmitting or receiving a carrier signal operating in a far-field region using the repurposed WWAN antenna.

4. The method of claim 1, wherein the NFC-type operations are performed in a near-radiating region, a transition region or a radiating region.

5. The method of claim 1, wherein the NFC-type operations are performed by a far-field radio.

6. The method of claim 1, wherein determining whether to perform NFC-type operations in the near-field mode or the far-field mode is based on polling in the near-field region and a far-field region.

7. The method of claim 1, wherein determining whether to perform NFC-type operations in the near-field mode or the far-field mode is based on a user selecting to operate a software application that is configured to operate in near-field mode or far-field mode.

8. The method of claim 1, wherein determining whether to perform NFC-type operations in the near-field mode or the far-field mode is based on location information.

9. The method of claim 1, wherein the NFC-type operations are performed by an NFC controller.

10. The method of claim 1, further comprising adjusting a matching network from a first impedance used in the near-field mode to a second impedance used in the far-field mode, wherein the first impedance produces a first resonant peak that coincides with a near-field frequency and the second impedance produces a second resonant peak that coincides with a far-field frequency.

11. The method of claim 1, wherein the WWAN antenna is coupled to an NFC controller and a WWAN block with a diplexer.

12. The method of claim 1, wherein the repurposed WWAN antenna is used for wireless local area network (WLAN) communication or Bluetooth (BT) communication.

13. The method of claim 12, wherein WLAN operations and NFC-type operations share a common radio and the repurposed WWAN antenna.

14. The method of claim 13, wherein the common radio is a WLAN 802.11 ah radio that is reconfigurable for NFC-type operations in a far-field region.

15. The method of claim 13, wherein base band signals from WLAN operations and NFC-type operations are multiplexed to the common radio.

16. The method of claim 12, wherein WLAN operations and NFC-type operations share a low noise amplifier (LNA) and share a power amplifier (PA) for full concurrency.

17. The method of claim 1, wherein a media access control (MAC), modem and radio used for wireless local area network (WLAN) communication are reconfigured for NFC-type operations.

18. The method of claim 1, further comprising:
   determining whether a far-field frequency for NFC-type operations is supported by the repurposed WWAN antenna alone; and
   combining the repurposed WWAN antenna and an NFC loop antenna to create a composite antenna for performing NFC-type operations outside the near-field region when the far-field frequency is lower than can be supported by the repurposed WWAN antenna alone.

19. The method of claim 1, further comprising performing concurrent NFC-type operations inside the near-field region using a NFC loop antenna and outside the near-field region using the repurposed WWAN antenna.

20. The method of claim 1, wherein performing the NFC-type operations outside a near-field region comprises performing a polling frequency sweep using far-field frequencies.

21. The method of claim 1, wherein the WWAN antenna is configured for cellular communication.

22. A wireless communication device, comprising:
a processor;
a memory in communication with the processor; and
instructions stored in the memory, the instructions executable by the processor to:
determine whether to perform near-field communication (NFC)-type operations in a near-field mode or a far-field mode;
perform the NFC-type operations inside a near-field region using an NFC loop antenna when in the near-field mode;
perform the NFC-type operations outside the near-field region using a repurposed wireless wide area network (WWAN) antenna when in the far-field mode; and
perform, in response to determining the far-field mode, a packet arbitration procedure for WWAN communication and the NFC-type operations outside the near-field region.

23. The wireless communication device of claim 22, wherein the NFC-type operations include wireless communication based on NFC protocols or radio frequency identification (RFID) protocols.

24. The wireless communication device of claim 22, wherein performing the NFC-type operations outside the near-field region comprises transmitting or receiving a carrier signal operating in a far-field region using the repurposed WWAN antenna.

25. The wireless communication device of claim 22, wherein the NFC-type operations are performed by a far-field radio.

26. The wireless communication device of claim 22, wherein the NFC-type operations are performed by an NFC controller.

27. The wireless communication device of claim 22, wherein the repurposed WWAN antenna is used for wireless local area network (WLAN) communication or Bluetooth (BT) communication.

28. An apparatus for wireless communications, comprising:
means for determining whether to perform near-field communication (NFC)-type operations in a near-field mode or a far-field mode;
means for performing the NFC-type operations inside a near-field region using an NFC loop antenna when in the near-field mode;
means for performing the NFC-type operations outside the near-field region using a repurposed wireless wide area network (WWAN) antenna when in the far-field mode; and
means for performing, in response to determining the far-field mode, a packet arbitration procedure for WWAN communication and the NFC-type operations outside the near-field region.

29. The apparatus of claim 28, wherein the NFC-type operations include wireless communication based on NFC protocols or radio frequency identification (RFID) protocols.

30. The apparatus of claim 28, wherein performing the NFC-type operations outside the near-field region comprises transmitting or receiving a carrier signal operating in a far-field region using the repurposed WWAN antenna.

31. The apparatus of claim 28, wherein the NFC-type operations are performed by a far-field radio.

32. The apparatus of claim 28, wherein the NFC-type operations are performed by an NFC controller.

33. The apparatus of claim 28, wherein the repurposed WWAN antenna is used for wireless local area network (WLAN) communication or Bluetooth (BT) communication.

34. A computer-program product for wireless communications, the computer-program product comprising a non-transitory computer-readable medium having instructions thereon, the instructions comprising:
code for causing a wireless communication device to determine whether to perform near-field communication (NFC)-type operations in a near-field mode or a far-field mode;
code for causing the wireless communication device to perform the NFC-type operations inside a near-field region using an NFC loop antenna when in the near-field mode;
code for causing the wireless communication device to perform the NFC-type operations outside a near-field region using a repurposed wireless wide area network (WWAN) antenna when in the far-field mode; and
code for causing the wireless communication device to perform, in response to determining the far-field mode, a packet arbitration procedure for WWAN communication and the NFC-type operations outside the near-field region.

35. The computer-program product of claim 34, wherein the NFC-type operations include wireless communication based on NFC protocols or radio frequency identification (RFID) protocols.

36. The computer-program product of claim 34, wherein performing the NFC-type operations outside the near-field region comprises transmitting or receiving a carrier signal operating in a far-field region using the repurposed WWAN antenna.

37. The computer-program product of claim 34, wherein the NFC-type operations are performed by a far-field radio.

38. The computer-program product of claim 34, wherein the NFC-type operations are performed by an NFC controller.

39. The computer-program product of claim 34, wherein the repurposed antenna is used for wireless local area network (WLAN) communication or Bluetooth (BT) communication.

* * * * *